US008631282B2

(12) United States Patent
Kurihara et al.

(10) Patent No.: US 8,631,282 B2
(45) Date of Patent: Jan. 14, 2014

(54) STORAGE SYSTEM USING SAS STANDARD BACK-END COMMUNICATION

(75) Inventors: Tomoaki Kurihara, Odawara (JP); Toshihiro Nitta, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 362 days.

(21) Appl. No.: 13/000,002

(22) PCT Filed: Nov. 30, 2010

(86) PCT No.: PCT/JP2010/006976
§ 371 (c)(1),
(2), (4) Date: Dec. 17, 2010

(87) PCT Pub. No.: WO2012/073276
PCT Pub. Date: Jun. 7, 2012

(65) Prior Publication Data
US 2012/0137166 A1 May 31, 2012

(51) Int. Cl.
G06F 11/00 (2006.01)
(52) U.S. Cl.
USPC .......................................... 714/43
(58) Field of Classification Search
USPC .................................... 714/42, 43
See application file for complete search history.

(56) References Cited

U.S. PATENT DOCUMENTS

| 2005/0278581 | A1* | 12/2005 | Jiang et al. ..................... 714/40 |
| 2006/0047908 | A1 | 3/2006 | Chikusa et al. |
| 2008/0010530 | A1 | 1/2008 | Davies et al. |
| 2008/0244098 | A1* | 10/2008 | Oikawa et al. ................... 710/5 |
| 2009/0132866 | A1 | 5/2009 | Makino |
| 2009/0187707 | A1* | 7/2009 | Benhase et al. ............... 711/114 |

FOREIGN PATENT DOCUMENTS

| EP | 1 975 797 A2 | 10/2008 |
| JP | 2005-339216 | 12/2005 |

OTHER PUBLICATIONS

PCT International Search Report and Written Opinion on application No. PCT/JP2010/006976 mailed Jun. 27, 2011; 11 pages.

* cited by examiner

Primary Examiner — Michael Maskulinski
Assistant Examiner — Neil Miles
(74) Attorney, Agent, or Firm — Foley & Lardner LLP

(57) ABSTRACT

Each of SAS expanders ("expander(s)" hereinafter) has a switch device for switching whether to bypass the expander in each communication path or not. Of the plurality of switch devices, an actual connection destination of a switch device bypassing the expander is a switch device in a upper-level and/or a lower-level of the switch device. Of the plurality of switch devices, an actual connection destination of a switch device that does not bypass an expander is the expander.

9 Claims, 39 Drawing Sheets

Fig. 9

| Path no. | Column number | Expander information SAS address | Phy no. | Drive information Base system SAS address | Other system SAS address |
|---|---|---|---|---|---|
| 1 | 1 | Expander 00 SAS address | 00 | Drive 00 SAS address 0 | Drive 00 SAS address 1 |
| | | | 01 | Drive 01 SAS address 0 | Drive 01 SAS address 1 |
| | | | ... | ... | ... |
| 1 | 2 | Expander 01 SAS address | 00 | Drive 25 SAS address 0 | Drive 25 SAS address 1 |
| | | | 01 | Drive 26 SAS address 0 | Drive 26 SAS address 1 |
| | | | ... | ... | ... |
| ... | ... | ... | ... | ... | ... |
| 2 | 1 | Expander 10 SAS address | 00 | Drive 00 SAS address 1 | Drive 00 SAS address 0 |
| | | | 01 | Drive 01 SAS address 1 | Drive 01 SAS address 0 |
| | | | ... | ... | ... |
| ... | ... | ... | ... | ... | ... |

| No. | SAS controller #0 | | SAS controller #1 | | |
|---|---|---|---|---|---|
| | Command | Condition | Command | Condition | |
| 1 | Read | Issued | Read | Issued |
| 2 | Write | Issued | Write | Issued |
| 3 | Read | Issued | Read | Issued |
| 4 | Read | Unissued | Write | Issued |
| 5 | Write | Unissued | Write | Unissued |
| ... | ... | ... | ... | ... |

Fig. 11A

| ENC No. 1111 | MUX control expander | | | | | | | |
|---|---|---|---|---|---|---|---|---|
| | First communication path | | | | Second communication path | | | |
| | Expander SAS Address 1112 | MUX No. 1113 | SW No. 1114a | SW connection destination 1114b | Expander SAS Address 1115 | MUX No. 1116 | SW No. 1117a | SW connection destination 1117b |
| 0 | Expander 00 SAS address | 00 | 1 | UL | Expander 10 SAS address | 00 | 1 | UL |
| | | | 2 | UL | | | 2 | UL |
| | | | 3 | UL | | | 3 | UL |
| | | | 4 | UL | | | 4 | UL |
| | | | 5 | Expander | | | 5 | Expander |
| | | | 6 | Expander | | | 6 | Expander |
| | | | 7 | Expander | | | 7 | Expander |
| | | | 8 | Expander | | | 8 | Expander |
| | | 01 | 1 | Expander | | 01 | 1 | Expander |
| | | | 2 | Expander | | | 2 | Expander |
| | | | 3 | Expander | | | 3 | Expander |
| | | | 4 | Expander | | | 4 | Expander |
| | | | 5 | LL | | | 5 | LL |
| | | | 6 | LL | | | 6 | LL |
| | | | 7 | LL | | | 7 | LL |
| | | | 8 | LL | | | 8 | LL |
| | | 02 | 1 | UL | | 02 | 1 | UL |
| | | | 2 | UL | | | 2 | UL |
| | | | 3 | UL | | | 3 | UL |
| | | | 4 | UL | | | 4 | UL |
| | | | 5 | Expander | | | 5 | Expander |
| | | | 6 | Expander | | | 6 | Expander |
| | | | 7 | LL | | | 7 | LL |
| | | | 8 | LL | | | 8 | LL |
| | | 03 | 1 | UL | | 03 | 1 | UL |
| | | | 2 | UL | | | 2 | UL |
| | | | 3 | UL | | | 3 | UL |
| | | | 4 | UL | | | 4 | UL |
| | | | 5 | Expander | | | 5 | Expander |
| | | | 6 | Expander | | | 6 | Expander |
| | | | 7 | Expander | | | 7 | Expander |
| | | | 8 | Expander | | | 8 | Expander |
| ... | ... | ... | ... | ... | ... | ... | ... | ... |

Connecting to Fig. 11A

Fig. 13

| Expander No. | Group of upper-level/lower-level phy numbers 855 | | | | | | | |
|---|---|---|---|---|---|---|---|---|
| | UL phy No. | UL phy No. | UL phy No. | UL phy No. | LL phy No. | LL phy No. | LL phy No. | LL phy No. |
| 1 | 00 | 01 | 02 | 03 | 04 | 05 | 06 | 07 |
| 2 | 00 | 01 | 02 | 03 | 04 | 05 | 06 | 07 |
| ... | ... | ... | ... | ... | ... | ... | ... | ... |

| Expander No. | Number of status changes 855 | | | | | |
|---|---|---|---|---|---|---|
| | Phy #00 | Phy #01 | Phy #02 | Phy #03 | Phy #04 | ... |
| 1 | 2 | 3 | 1 | 4 | 2 | ... |
| 2 | 4 | 12 | 4 | 6 | 3 | ... |
| ... | ... | ... | ... | ... | ... | ... |

| EXP No. | SAS link No. | | | | | | | |
|---|---|---|---|---|---|---|---|---|
| | 00 | 01 | 02 | 03 | 04 | 05 | 06 | 07 |
| 00 | ○ | ○ | ○ | ○ | ○ | × | × | × |
| 01 | ○ | ○ | ○ | ○ | ○ | × | × | × |
| 02 | ○ | ○ | ○ | ○ | ○ | × | × | × |
| 03 | ○ | ○ | ○ | ○ | ○ | × | × | × |
| 04 | ○ | ○ | ○ | ○ | ○ | ○ | ○ | ○ |
| 05 | ○ | ○ | ○ | ○ | ○ | ○ | ○ | ○ |
| 06 | ○ | ○ | ○ | ○ | ○ | ○ | ○ | ○ |
| 07 | ○ | ○ | ○ | ○ | ○ | ○ | ○ | ○ |

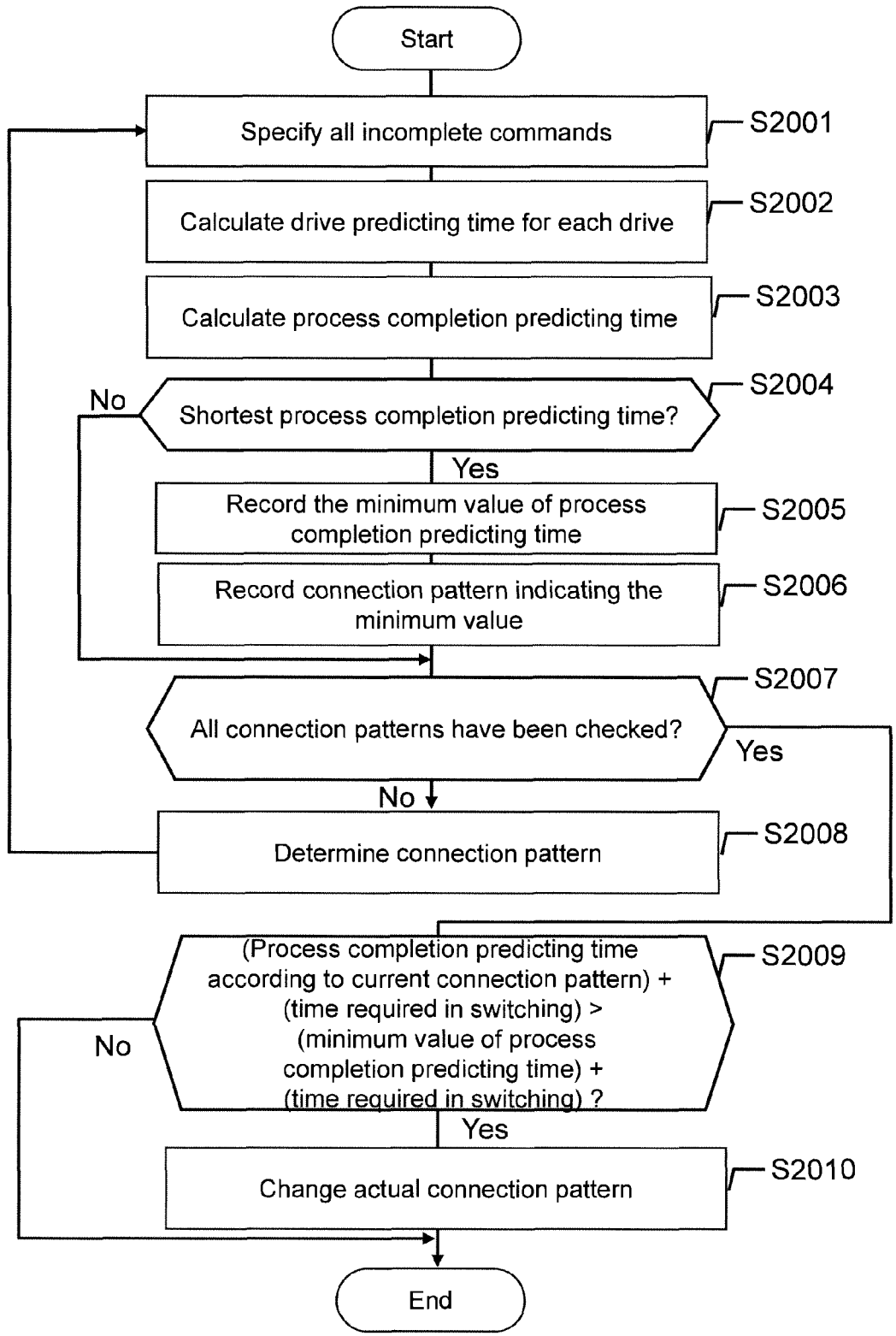

Fig. 21

Information required for obtaining processing time

| Item | Symbol | Before abbreviation |
|---|---|---|
| Data reading speed of drive | RTR | Read Transfer Rate |
| Data writing speed of drive | WTR | Write Transfer Rate |
| Data transfer length for each command | LNG | LeNGth |
| Data transfer bandwidth per SAS link | BW | BandWidth |
| Number of Expanders | NE | Number of Expander |
| Number of drives carrying unprocessed commands in each expander | ND | Number of Drive |
| Number of SAS links | NL | Number of sas Link |
| Number of commands of each drive | NC | Number of Command |
| Sum of data transfer delay caused by expander routing | DLY | DeLaY |

Fig. 22A

Subscripts used for distinguishing between the same symbols

| Subscript | Content |
|---|---|
| h | Command number |
| i | SAS link number |
| j | EXP number |
| k | Drive number |

Fig. 22B

| EXP No.(j) 2221 | Drive No.(k) 2222 | Command 2223 | RDC 2224 | Transfer length (LNG) 2225 | 2210 |
|---|---|---|---|---|---|
| 1 | 1 | Read | 1 | 64k | |
| 1 | 1 | Read | 1 | 64k | |
| 1 | 1 | Read | 1 | 64k | |
| 1 | 1 | Write | 0 | 64k | |
| 1 | 2 | Write | 0 | 64k | |
| 1 | 2 | Read | 1 | 128k | |
| 1 | 2 | Write | 0 | 128k | |
| 1 | 3 | Read | 1 | 128k | |
| 2 | 1 | Write | 0 | 512k | |
| 2 | 1 | Read | 1 | 64k | |
| ... | ... | ... | ... | 128k | |

Incomplete command management table

Fig. 23

Symbols used conveniently in computation step

| Item | Symbol | Before abbreviation |
|---|---|---|
| Drive average transfer speed | ATR | Average Transfer Rate |
| Distinguish read command (1 when command is read command, 0 when command is write command) | RDC | ReaD Command |
| Number of drives carrying unprocessed commands in each SAS link | NDL | Number of Drive in sas Link |
| Probability at which expander can acquire one SAS link | PEGL | Probability of Exp Getting sas Link |
| Connection relationship between expander and SAS link (1 at the time of connection, 0 at the time of non-connection) | CNCT | CoNeCTion |
| Sum of probabilities at which expanders can acquire SAS links | SPEGL | Summation of Probability of Exp Getting sas Link |
| Rate of use of SAS links by expanders | PEUL | Proportion of Exp Using sas Link |
| Maximum bandwidth available when expanders use SAS links (restricted by drive transfer speed) | MBD | Maximum Bandwidth limited by Drive transfer rate |
| Maximum bandwidth available when expanders use SAS links (restricted by bandwidths of SAS links) | MBL | Maximum Bandwidth limited by sas Link bandwidth |
| Bandwidths available when expanders use SAS links | OBW | Obtained BandWidth |
| Sum of bandwidths available when expanders use SAS links | SOBW | Summation of Obtained BandWidth |
| Bandwidth per drive of expander | OBWD | Obtained BandWidth per Drive |
| Sum of unprocessed command transfer lengths by one drive | SLNG | Summation of LeNGth |
| All command completion predicting times of one drive | PTP | Predicting Time for Processing |
| Minimum value of drive all command completion predicting times | MPTP | Minimum Predicting Time for Processing |
| Total completion predicting time | PTTP | Prediction Total Time for Processing |

Fig. 24A

| | Transfer speed [MB/s] |
|---|---|
| RTR | 120 |
| WTR | 100 |

| Command No. (h) | Command type | Transfer length [kB] | RDC | RDC × LNG ÷ RTR | (1-RDC) × LNG ÷ RTR |
|---|---|---|---|---|---|
| 1 | Read | 64 | 1 | 0.53333333 | 0 |
| 2 | Read | 128 | 1 | 1.066666667 | 0 |
| 3 | Read | 512 | 1 | 4.266666667 | 0 |
| 4 | Write | 64 | 0 | 0 | 0.64 |
| 5 | Write | 128 | 0 | 0 | 1.28 |
| Total | | 896 | | 5.866666667 | 1.92 |

Fig. 24C

| | Transfer speed [MB/s] |
|---|---|
| ATR | 115.0684932 |

Fig. 25A

| | | SAS Link No.(i) | | | | | | | |
|---|---|---|---|---|---|---|---|---|---|
| | | 00 | 01 | 02 | 03 | 04 | 05 | 06 | 07 |
| EXP No.(j) | 00 | 1 | 1 | 1 | 1 | 1 | 0 | 0 | 0 |
| | 01 | 1 | 1 | 1 | 1 | 1 | 0 | 0 | 0 |
| | 02 | 1 | 1 | 1 | 1 | 1 | 0 | 0 | 0 |
| | 03 | 1 | 1 | 1 | 1 | 1 | 0 | 0 | 0 |
| | 04 | 1 | 1 | 1 | 1 | 1 | 1 | 1 | 1 |
| | 05 | 1 | 1 | 1 | 1 | 1 | 1 | 1 | 1 |
| | 06 | 1 | 1 | 1 | 1 | 1 | 1 | 1 | 1 |
| | 07 | 1 | 1 | 1 | 1 | 1 | 1 | 1 | 1 |

Fig. 25B

| | | ND |
|---|---|---|
| EXP No.(j) | 00 | 5 |
| | 01 | 5 |
| | 02 | 10 |
| | 03 | 10 |
| | 04 | 10 |
| | 05 | 15 |
| | 06 | 15 |
| | 07 | 20 |

Fig. 26A

| | | SAS Link No.(i) | | | | | | | |
|---|---|---|---|---|---|---|---|---|---|
| | | 00 | 01 | 02 | 03 | 04 | 05 | 06 | 07 |
| EXP No.(j) | 00 | 5 | 5 | 5 | 5 | 5 | 0 | 0 | 0 |
| | 01 | 5 | 5 | 5 | 5 | 5 | 0 | 0 | 0 |
| | 02 | 10 | 10 | 10 | 10 | 10 | 0 | 0 | 0 |
| | 03 | 10 | 10 | 10 | 10 | 10 | 0 | 0 | 0 |
| | 04 | 10 | 10 | 10 | 10 | 10 | 10 | 10 | 10 |
| | 05 | 15 | 15 | 15 | 15 | 15 | 15 | 15 | 15 |
| | 06 | 15 | 15 | 15 | 15 | 15 | 15 | 15 | 15 |
| | 07 | 20 | 20 | 20 | 20 | 20 | 20 | 20 | 20 |

Fig. 26B

| | SAS Link No.(i) | | | | | | | |
|---|---|---|---|---|---|---|---|---|
| | 00 | 01 | 02 | 03 | 04 | 05 | 06 | 07 |
| NDL | 90 | 90 | 90 | 90 | 90 | 60 | 60 | 60 |

Fig. 27

|  |  | SAS Link No.(i) | | | | | | | |
|---|---|---|---|---|---|---|---|---|---|
|  |  | 00 | 01 | 02 | 03 | 04 | 05 | 06 | 07 |
| EXP No.(j) | 00 | 0.055556 | 0.055556 | 0.055556 | 0.055556 | 0.055556 | 0 | 0 | 0 |
|  | 01 | 0.055556 | 0.055556 | 0.055556 | 0.055556 | 0.055556 | 0 | 0 | 0 |
|  | 02 | 0.111111 | 0.111111 | 0.111111 | 0.111111 | 0.111111 | 0 | 0 | 0 |
|  | 03 | 0.111111 | 0.111111 | 0.111111 | 0.111111 | 0.111111 | 0 | 0 | 0 |
|  | 04 | 0.111111 | 0.111111 | 0.111111 | 0.111111 | 0.111111 | 0.166667 | 0.166667 | 0.166667 |
|  | 05 | 0.166667 | 0.166667 | 0.166667 | 0.166667 | 0.166667 | 0.25 | 0.25 | 0.25 |
|  | 06 | 0.166667 | 0.166667 | 0.166667 | 0.166667 | 0.166667 | 0.25 | 0.25 | 0.25 |
|  | 07 | 0.222222 | 0.222222 | 0.222222 | 0.222222 | 0.222222 | 0.333333 | 0.333333 | 0.333333 |

Fig. 28

| | | SPEGL |
|---|---|---|
| EXP No.(j) | 00 | 0.277778 |
| | 01 | 0.277778 |
| | 02 | 0.555556 |
| | 03 | 0.555556 |
| | 04 | 1.055556 |
| | 05 | 1.583333 |
| | 06 | 1.583333 |
| | 07 | 2.111111 |

Fig. 29A

|  |  | SAS Link No.(i) | | | | | | | |
|---|---|---|---|---|---|---|---|---|---|
|  |  | 00 | 01 | 02 | 03 | 04 | 05 | 06 | 07 |
| EXP No.(j) | 00 | 0.2 | 0.2 | 0.2 | 0.2 | 0.2 | 0 | 0 | 0 |
|  | 01 | 0.2 | 0.2 | 0.2 | 0.2 | 0.2 | 0 | 0 | 0 |
|  | 02 | 0.2 | 0.2 | 0.2 | 0.2 | 0.2 | 0 | 0 | 0 |
|  | 03 | 0.2 | 0.2 | 0.2 | 0.2 | 0.2 | 0 | 0 | 0 |
|  | 04 | 0.105263 | 0.105263 | 0.105263 | 0.105263 | 0.105263 | 0.157895 | 0.157895 | 0.157895 |
|  | 05 | 0.105263 | 0.105263 | 0.105263 | 0.105263 | 0.105263 | 0.157895 | 0.157895 | 0.157895 |
|  | 06 | 0.105263 | 0.105263 | 0.105263 | 0.105263 | 0.105263 | 0.157895 | 0.157895 | 0.157895 |
|  | 07 | 0.105263 | 0.105263 | 0.105263 | 0.105263 | 0.105263 | 0.157895 | 0.157895 | 0.157895 |

Fig. 29B

|  |  | SAS Link No.(i) | | | | | | | |
|---|---|---|---|---|---|---|---|---|---|
|  |  | 00 | 01 | 02 | 03 | 04 | 05 | 06 | 07 |
| EXP No.(j) | 00 | 115.0685 | 115.0685 | 115.0685 | 115.0685 | 115.0685 | 0 | 0 | 0 |
|  | 01 | 115.0685 | 115.0685 | 115.0685 | 115.0685 | 115.0685 | 0 | 0 | 0 |
|  | 02 | 230.137 | 230.137 | 230.137 | 230.137 | 230.137 | 0 | 0 | 0 |
|  | 03 | 230.137 | 230.137 | 230.137 | 230.137 | 230.137 | 0 | 0 | 0 |
|  | 04 | 121.1247 | 121.1247 | 121.1247 | 121.1247 | 121.1247 | 181.6871 | 181.6871 | 181.6871 |
|  | 05 | 181.6871 | 181.6871 | 181.6871 | 181.6871 | 181.6871 | 272.5306 | 272.5306 | 272.5306 |
|  | 06 | 181.6871 | 181.6871 | 181.6871 | 181.6871 | 181.6871 | 272.5306 | 272.5306 | 272.5306 |
|  | 07 | 242.2495 | 242.2495 | 242.2495 | 242.2495 | 242.2495 | 363.3742 | 363.3742 | 363.3742 |

Fig. 30A

|    | Bandwidth [MB] |
|----|----------------|
| BW | 600            |

Fig. 30B

|            |    | SAS Link No.(i) |          |          |          |          |     |     |     |
|------------|----|----------|----------|----------|----------|----------|-----|-----|-----|
|            |    | 00       | 01       | 02       | 03       | 04       | 05  | 06  | 07  |
| EXP No.(j) | 00 | 33.33333 | 33.33333 | 33.33333 | 33.33333 | 33.33333 | 0   | 0   | 0   |
|            | 01 | 33.33333 | 33.33333 | 33.33333 | 33.33333 | 33.33333 | 0   | 0   | 0   |
|            | 02 | 66.66667 | 66.66667 | 66.66667 | 66.66667 | 66.66667 | 0   | 0   | 0   |
|            | 03 | 66.66667 | 66.66667 | 66.66667 | 66.66667 | 66.66667 | 0   | 0   | 0   |
|            | 04 | 66.66667 | 66.66667 | 66.66667 | 66.66667 | 66.66667 | 100 | 100 | 100 |
|            | 05 | 100      | 100      | 100      | 100      | 100      | 150 | 150 | 150 |
|            | 06 | 100      | 100      | 100      | 100      | 100      | 150 | 150 | 150 |
|            | 07 | 133.3333 | 133.3333 | 133.3333 | 133.3333 | 133.3333 | 200 | 200 | 200 |

Fig. 31A

|  |  | SAS Link No.(i) | | | | | | | |
|---|---|---|---|---|---|---|---|---|---|
|  |  | 00 | 01 | 02 | 03 | 04 | 05 | 06 | 07 |
| EXP No.(j) | 00 | 33.33333 | 33.33333 | 33.33333 | 33.33333 | 33.33333 | 0 | 0 | 0 |
|  | 01 | 33.33333 | 33.33333 | 33.33333 | 33.33333 | 33.33333 | 0 | 0 | 0 |
|  | 02 | 66.66667 | 66.66667 | 66.66667 | 66.66667 | 66.66667 | 0 | 0 | 0 |
|  | 03 | 66.66667 | 66.66667 | 66.66667 | 66.66667 | 66.66667 | 0 | 0 | 0 |
|  | 04 | 66.66667 | 66.66667 | 66.66667 | 66.66667 | 66.66667 | 100 | 100 | 100 |
|  | 05 | 100 | 100 | 100 | 100 | 100 | 150 | 150 | 150 |
|  | 06 | 100 | 100 | 100 | 100 | 100 | 150 | 150 | 150 |
|  | 07 | 133.3333 | 133.3333 | 133.3333 | 133.3333 | 133.3333 | 200 | 200 | 200 |

Fig. 31B

|  |  | SOBW |
|---|---|---|
| EXP No.(j) | 00 | 166.6667 |
|  | 01 | 166.6667 |
|  | 02 | 333.3333 |
|  | 03 | 333.3333 |
|  | 04 | 633.3333 |
|  | 05 | 950 |
|  | 06 | 950 |
|  | 07 | 1266.667 |

Fig. 32

| | | OBWD |
|---|---|---|
| EXP No.(j) | 00 | 33.33333 |
| | 01 | 33.33333 |
| | 02 | 33.33333 |
| | 03 | 33.33333 |
| | 04 | 63.33333 |
| | 05 | 63.33333 |
| | 06 | 63.33333 |
| | 07 | 63.33333 |

Fig. 33

| | | \multicolumn{8}{c|}{EXP No.(j)} |
|---|---|---|---|---|---|---|---|---|---|
| | | 00 | 01 | 02 | 03 | 04 | 05 | 06 | 07 |
| DriveNo.(k) | 00 | 896 | 896 | 896 | 896 | 896 | 896 | 896 | 896 |
| | 01 | 896 | 896 | 896 | 896 | 896 | 896 | 896 | 896 |
| | 02 | 896 | 896 | 896 | 896 | 896 | 896 | 896 | 896 |
| | 03 | 896 | 896 | 896 | 896 | 896 | 896 | 896 | 896 |
| | 04 | 896 | 896 | 896 | 896 | 896 | 896 | 896 | 896 |
| | 05 | | | 896 | 896 | 896 | 896 | 896 | 896 |
| | 06 | | | 896 | 896 | 896 | 896 | 896 | 896 |
| | 07 | | | 896 | 896 | 896 | 896 | 896 | 896 |
| | 08 | | | 896 | 896 | 896 | 896 | 896 | 896 |
| | 09 | | | 896 | 896 | 896 | 896 | 896 | 896 |
| | 10 | | | | | | 896 | 896 | 896 |
| | 11 | | | | | | 896 | 896 | 896 |
| | 12 | | | | | | 896 | 896 | 896 |
| | 13 | | | | | | 896 | 896 | 896 |
| | 14 | | | | | | 896 | 896 | 896 |
| | 15 | | | | | | | | 896 |
| | 16 | | | | | | | | 896 |
| | 17 | | | | | | | | 896 |
| | 18 | | | | | | | | 896 |
| | 19 | | | | | | | | 896 |

Fig. 34

|  |  | EXP No.(j) | | | | | | | |
|---|---|---|---|---|---|---|---|---|---|
|  |  | 00 | 01 | 02 | 03 | 04 | 05 | 06 | 07 |
| DriveNo.(k) | 00 | 10 | 15 | 20 | 25 | 22.5 | 27.5 | 32.5 | 37.5 |
|  | 01 | 10 | 15 | 20 | 25 | 22.5 | 27.5 | 32.5 | 37.5 |
|  | 02 | 10 | 15 | 20 | 25 | 22.5 | 27.5 | 32.5 | 37.5 |
|  | 03 | 10 | 15 | 20 | 25 | 22.5 | 27.5 | 32.5 | 37.5 |
|  | 04 | 10 | 15 | 20 | 25 | 22.5 | 27.5 | 32.5 | 37.5 |
|  | 05 |  |  | 20 | 25 | 22.5 | 27.5 | 32.5 | 37.5 |
|  | 06 |  |  | 20 | 25 | 22.5 | 27.5 | 32.5 | 37.5 |
|  | 07 |  |  | 20 | 25 | 22.5 | 27.5 | 32.5 | 37.5 |
|  | 08 |  |  | 20 | 25 | 22.5 | 27.5 | 32.5 | 37.5 |
|  | 09 |  |  | 20 | 25 | 22.5 | 27.5 | 32.5 | 37.5 |
|  | 10 |  |  |  |  |  | 27.5 | 32.5 | 37.5 |
|  | 11 |  |  |  |  |  | 27.5 | 32.5 | 37.5 |
|  | 12 |  |  |  |  |  | 27.5 | 32.5 | 37.5 |
|  | 13 |  |  |  |  |  | 27.5 | 32.5 | 37.5 |
|  | 14 |  |  |  |  |  | 27.5 | 32.5 | 37.5 |
|  | 15 |  |  |  |  |  |  |  | 37.5 |
|  | 16 |  |  |  |  |  |  |  | 37.5 |
|  | 17 |  |  |  |  |  |  |  | 37.5 |
|  | 18 |  |  |  |  |  |  |  | 37.5 |
|  | 19 |  |  |  |  |  |  |  | 37.5 |

Fig. 35

|  |  | EXP No.(j) | | | | | | | |
|---|---|---|---|---|---|---|---|---|---|
|  |  | 00 | 01 | 02 | 03 | 04 | 05 | 06 | 07 |
| DriveNo.(k) | 00 | 36.88 | 41.88 | 46.88 | 51.88 | 36.64737 | 41.64737 | 46.64737 | 51.64737 |
|  | 01 | 36.88 | 41.88 | 46.88 | 51.88 | 36.64737 | 41.64737 | 46.64737 | 51.64737 |
|  | 02 | 36.88 | 41.88 | 46.88 | 51.88 | 36.64737 | 41.64737 | 46.64737 | 51.64737 |
|  | 03 | 36.88 | 41.88 | 46.88 | 51.88 | 36.64737 | 41.64737 | 46.64737 | 51.64737 |
|  | 04 | 36.88 | 41.88 | 46.88 | 51.88 | 36.64737 | 41.64737 | 46.64737 | 51.64737 |
|  | 05 |  |  | 46.88 | 51.88 | 36.64737 | 41.64737 | 46.64737 | 51.64737 |
|  | 06 |  |  | 46.88 | 51.88 | 36.64737 | 41.64737 | 46.64737 | 51.64737 |
|  | 07 |  |  | 46.88 | 51.88 | 36.64737 | 41.64737 | 46.64737 | 51.64737 |
|  | 08 |  |  | 46.88 | 51.88 | 36.64737 | 41.64737 | 46.64737 | 51.64737 |
|  | 09 |  |  | 46.88 | 51.88 | 36.64737 | 41.64737 | 46.64737 | 51.64737 |
|  | 10 |  |  |  |  |  | 41.64737 | 46.64737 | 51.64737 |
|  | 11 |  |  |  |  |  | 41.64737 | 46.64737 | 51.64737 |
|  | 12 |  |  |  |  |  | 41.64737 | 46.64737 | 51.64737 |
|  | 13 |  |  |  |  |  | 41.64737 | 46.64737 | 51.64737 |
|  | 14 |  |  |  |  |  | 41.64737 | 46.64737 | 51.64737 |
|  | 15 |  |  |  |  |  |  |  | 51.64737 |
|  | 16 |  |  |  |  |  |  |  | 51.64737 |
|  | 17 |  |  |  |  |  |  |  | 51.64737 |
|  | 18 |  |  |  |  |  |  |  | 51.64737 |
|  | 19 |  |  |  |  |  |  |  | 51.64737 |

Fig. 36

|  |  | EXP No.(j) | | | | | | | |
| --- | --- | --- | --- | --- | --- | --- | --- | --- | --- |
|  |  | 00 | 01 | 02 | 03 | 04 | 05 | 06 | 07 |
| DriveNo.(k) | 00 | -325.579 | -325.579 | -325.579 | -325.579 | -1425 | -1425 | -1425 | -1425 |
|  | 01 | -325.579 | -325.579 | -325.579 | -325.579 | -1425 | -1425 | -1425 | -1425 |
|  | 02 | -325.579 | -325.579 | -325.579 | -325.579 | -1425 | -1425 | -1425 | -1425 |
|  | 03 | -325.579 | -325.579 | -325.579 | -325.579 | -1425 | -1425 | -1425 | -1425 |
|  | 04 | -325.579 | -325.579 | -325.579 | -325.579 | -1425 | -1425 | -1425 | -1425 |
|  | 05 |  |  | -325.579 | -325.579 | -1425 | -1425 | -1425 | -1425 |
|  | 06 |  |  | -325.579 | -325.579 | -1425 | -1425 | -1425 | -1425 |
|  | 07 |  |  | -325.579 | -325.579 | -1425 | -1425 | -1425 | -1425 |
|  | 08 |  |  | -325.579 | -325.579 | -1425 | -1425 | -1425 | -1425 |
|  | 09 |  |  | -325.579 | -325.579 | -1425 | -1425 | -1425 | -1425 |
|  | 10 |  |  |  |  | -1425 | -1425 | -1425 | -1425 |
|  | 11 |  |  |  |  |  | -1425 | -1425 | -1425 |
|  | 12 |  |  |  |  |  | -1425 | -1425 | -1425 |
|  | 13 |  |  |  |  |  | -1425 | -1425 | -1425 |
|  | 14 |  |  |  |  |  | -1425 | -1425 | -1425 |
|  | 15 |  |  |  |  |  |  |  | -1425 |
|  | 16 |  |  |  |  |  |  |  | -1425 |
|  | 17 |  |  |  |  |  |  |  | -1425 |
|  | 18 |  |  |  |  |  |  |  | -1425 |
|  | 19 |  |  |  |  |  |  |  | -1425 |

Fig. 37

| | | EXP No.(j) | | | | | | | |
|---|---|---|---|---|---|---|---|---|---|
| | | 00 | 01 | 02 | 03 | 04 | 05 | 06 | 07 |
| DriveNo.(k) | 00 | 0.232632 | 5.232632 | 10.23263 | 15.23263 | 0 | 5 | 10 | 15 |
| | 01 | 0.232632 | 5.232632 | 10.23263 | 15.23263 | 0 | 5 | 10 | 15 |
| | 02 | 0.232632 | 5.232632 | 10.23263 | 15.23263 | 0 | 5 | 10 | 15 |
| | 03 | 0.232632 | 5.232632 | 10.23263 | 15.23263 | 0 | 5 | 10 | 15 |
| | 04 | 0.232632 | 5.232632 | 10.23263 | 15.23263 | 0 | 5 | 10 | 15 |
| | 05 | | | 10.23263 | 15.23263 | 0 | 5 | 10 | 15 |
| | 06 | | | 10.23263 | 15.23263 | 0 | 5 | 10 | 15 |
| | 07 | | | 10.23263 | 15.23263 | 0 | 5 | 10 | 15 |
| | 08 | | | 10.23263 | 15.23263 | 0 | 5 | 10 | 15 |
| | 09 | | | 10.23263 | 15.23263 | 0 | 5 | 10 | 15 |
| | 10 | | | | | | 5 | 10 | 15 |
| | 11 | | | | | | 5 | 10 | 15 |
| | 12 | | | | | | 5 | 10 | 15 |
| | 13 | | | | | | 5 | 10 | 15 |
| | 14 | | | | | | 5 | 10 | 15 |
| | 15 | | | | | | | | 15 |
| | 16 | | | | | | | | 15 |
| | 17 | | | | | | | | 15 |
| | 18 | | | | | | | | 15 |
| | 19 | | | | | | | | 15 |

STORAGE SYSTEM USING SAS STANDARD BACK-END COMMUNICATION

TECHNICAL FIELD

This invention relates to a storage system in which SAS (Serial Attached SCSI) standard back-end communication is used.

BACKGROUND ART

A SAS storage system shown in FIG. 1, for example, has been known as a storage system in which SAS standard communication is performed on the back-end (between a controller and a storage device) thereof ("SAS storage system" hereinafter).

The SAS storage system has duplex controllers ("CTL" hereinafter) 111, 111, and one or more enclosures 101. One or more enclosures 101 are coupled serially to the CTLs 111, 111.

Each enclosure 101 has a plurality of ports 121, a plurality of SAS expanders ("expanders" hereinafter) 123, and a plurality of storage devices 125. In the storage system, a communication path to each of the storage devices 125 is duplicated. One of the communication paths is coupled from one of the CTLs 111 to each of the storage devices 125 via one of the ports 121 and one or more of the expanders 123. The other communication path is coupled from the other CTL 111 to each of the storage devices 125 via another one of the ports 121 and any other one or more of the expanders 123. One or more of the expanders 123 and any other one or more of the expanders 123 are coupled to each other serially. A port 121 that is not coupled to either one of the CTLs 111 is sometimes coupled to a port of another enclosure (not shown). When data is written to the storage devices 125, the upstream side of the flow of the data (the CTL 111 side, for example) is referred to as "upper-level (UL)" and the other side as "lower-level (LL)."

When failure occurs in a certain expander 123 in one of the communication paths, the CTLs 111, 111 cannot access, through this communication path, the storage devices 125 that are coupled to all of the expanders 123 lower than this expander ("failed expander" hereinafter) 123. For this reason, the CTLs 111, 111 need to go through the other communication path in order to access the storage devices 125 that are coupled to the expanders 123 lower than the failed expander 123. However, this concentrates loads onto the expanders 123 in the other communication path.

In order to avoid this, a method for bypassing the failed expander is considered. Note that bypass technology associated with a storage system is disclosed in Patent Literature 1.

Patent Literature 1 discloses enclosures (ENC) coupled by a FC (Fibre Channel), each of which is provided with an ENC bypass for bypassing a FC loop, and a PBC (Port Bypass Circuit) for switching between whether to go through or to bypass the FC loop. More specifically, the ENC bypass is a bypass of a disk connection part. The PBC selects either the disk connection part or the ENC bypass through which data should be transferred. When the occurrence of failure is detected in the disk connection part, a controller is requested to bypass the disk connection part. Accordingly, the controller controls the PBC to switch a data communication path from the disk connection part to the ENC bypass.

CITATION LIST

Patent Literature

[PTL 1]
Japanese Patent Application Laid-open No. 2005-339216

SUMMARY OF INVENTION

Technical Problem

What can be considered, under assumption that the disk connection part described in Patent Literature 1 is the failed expander, is to bypass this failed expander.

However, the bypass technology for the storage system in which FC standard communication is performed on the back-end thereof ("FC storage system" hereinafter) cannot be simply applied to the SAS storage system. This is because the configuration and functionality of the disk connection part that can be bypassed in the FC storage system are different from the configuration and functionality of each expander of the SAS storage system. More specifically, a disk controller, as a device for controlling the fibre channel loop (Fiber Channel Arbitration Loop), does not have a function for routing a received I/O (Input/Output) command, but each expander has a plurality of phys as well as a routing function for outputting the received I/O command from any one of the plurality of phys.

Moreover, normally in the SAS storage system, because one enclosure has a fixed number of expanders and a fixed connection configuration, it is not possible to expand the expanders.

Therefore, an object of the present invention is to be able to bypass the expander in which failure occurs, and to expand the number of expanders.

Solution to Problem

In each communication path, each of the expanders has switch devices for switching between whether to bypass this expander or not. Of the plurality of switch devices, the actual connection destinations of the switch devices bypassing the expander thereof are the switch devices that are higher and/or lower than these switch devices. Of the plurality of switch devices, the actual connection destinations of the switch devices that do not bypass the expander thereof are this expander.

BRIEF DESCRIPTION OF DRAWINGS

FIG. 9 shows an example of the configuration of an expander/drive management table 851.

FIG. 10 shows an example of the configuration of a command management table 852.

FIG. 11A shows a part of an example of the configuration of a MUX connection management table 853.

FIG. 13 shows an example of the configuration of a upper-level/lower-level phy management table 855.

FIG. 14 shows an example of the configuration of a status change management table 856.

FIG. 19 shows a table illustrating an example of the configuration of the eight SAS links shown in FIG. 18.

FIG. 20 shows a flow of connection pattern control processing.

FIG. 21 shows the explanation of the symbols described in the following description and/or the diagrams.

FIG. 22A shows the explanation of reference numerals added to the symbols described in the following description and/or the diagrams; and FIG. 22B shows an incomplete command management table according to Embodiment 2.

FIG. 23 shows the explanation of symbols described in the following description.

FIG. 24A shows an example of the configuration of a table 2401 that illustrates the transfer speeds according to command types; and FIG. 24B shows an example of the results of calculation of RDC×LNG/RTR and (1×RDC)×LNG/RTR; and FIG. 24C shows an average data transfer speed calculated for a single media drive.

FIG. 25A shows an example of the configurations of virtual connection patterns obtained at the time of S2; and FIG. 25B shows an example of information indicating the number of media drives coupled to a certain expander.

FIG. 26A shows an example of CNCT×ND for each expander;

FIG. 26B shows an example of the number of media drives coupled to SAS links (i).

FIG. 27 shows an example of a $PEGL_{ij}$ for each expander.

FIG. 28 shows an example of a $SPEGL_{ij}$ for each expander.

FIG. 29A shows an example of a $PEUL_{ij}$ for each expander; and

FIG. 29B shows an example of an $MBD_{ij}$ for each expander.

FIG. 30A shows an example of a BW; and FIG. 30B shows an example of a $MBL_{ij}$ for each expander.

FIG. 31A shows an example of an $OBW_{ij}$ for each expander; and

FIG. 31B shows an example of an $SOBW_{ij}$ for each expander.

FIG. 32 shows an example of an $OBWD_j$ for each expander.

FIG. 33 shows an example of an $SLNG_{jk}$ for each media drive.

FIG. 34 shows an example of a $DLY_{jk}$ for each media drive.

FIG. 35 shows an example of a $PTP_{jk}$ for each media drive.

FIG. 36 shows an example of a $SLNG_{jk}$ for each media drive.

FIG. 37 shows an example of a $PTP_{jk}$ for each expander.

DESCRIPTION OF EMBODIMENTS

Figure 1:
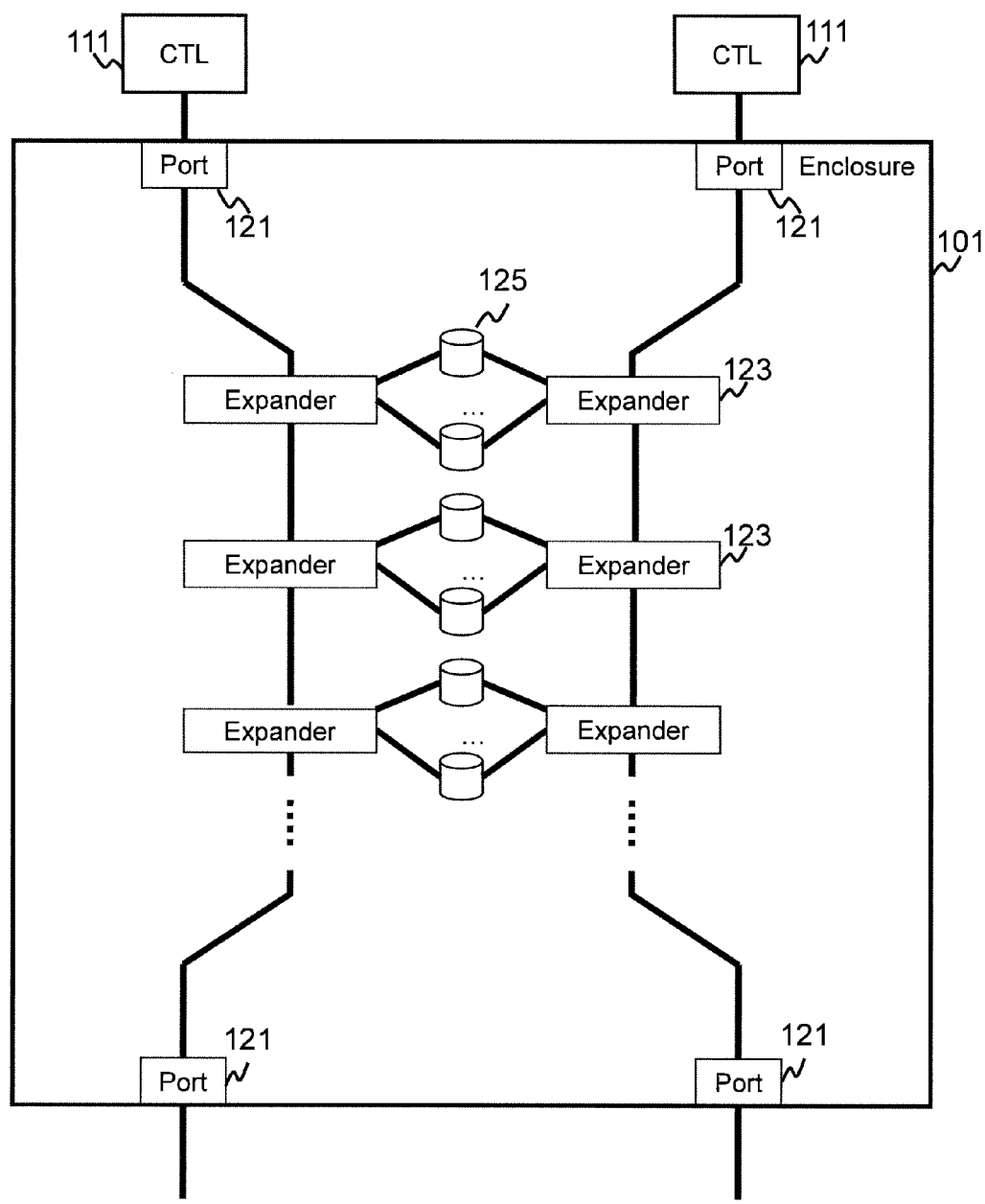
FIG. 1 shows an example of the configuration of a general storage system in which SAS standard communication is performed on the back-end thereof.

An embodiment of the present invention is described hereinafter with reference to the diagrams.

Note, in the following description, that a variety of information are illustrated in the form of "kkk tables," but these information may be represented by using data structures other than the tables. In order to explain that the information are not dependent on the data structures, "kkk tables" can also be referred to as "kkk information."

In addition, in the following description, various target identification information are represented by numbers, but various identification information that are not represented by numbers may be employed as well.

Moreover, in the following description, the term "program" is used as the subject in a sentence describing each processing step. However, because the program carries out certain processing by appropriately using a storage resource (a memory, for example) and/or a communication interface apparatus (a communication port, for example) by being executed by a processor (a CPU (Central Processing Unit), for example), the subject of the processing may be "processor." A processing step described by the term "program" as the subject may be carried out by a storage system, controller, or expander. The processor also may include a hardware circuit for carrying out part or all of the processing steps performed by the processor. A computer program may be installed from a program source into each computer. The program source may be, for example, a program distribution server or a storage medium.

In the following description, a plurality of the same elements can be discriminated from one another by identification numbers of the elements. For example, a plurality of elements A can be discriminated from one another by using a symbol "A #x." This symbol "A #x" represents an element A whose identification number is "x." The number "x" is an integer of 0 or above.

Furthermore, in the following description, a SAS expander is simply called "expander." An expander is a switch device.

In the following description, when writing data into a storage device, the upstream side (the controller side, for example) of the flow of the data is sometimes referred to as "upper-level," while the other side is sometimes referred to as "lower-level."

In the following description, such an expression as "directly coupled" means coupling to a phy without interposing a single phy. An expression "indirectly coupled" means that a device (a storage device or expander) is coupled to a phy via one or more phys.

Also, in the following description, a device (a storage device or expander) that is directly coupled to a phy is sometimes referred to as "direct device." A device that is indirectly coupled to the phy is sometimes referred to as "indirect device."

In the following description, out of a plurality of elements provided in a single device, two or more elements that are coupled to a device higher than this device are referred to as "upper-level elements," and two or more elements that are coupled to a device lower than this device are referred to as "lower-level elements." Thus, for example, out of a plurality of phys provided in a single expander, the phys that are coupled to a upper-level expander are upper-level phys, and the phys that are coupled to a lower expander are lower-level phys.

In the following description, an expression such as "link down" means inability to communicate to the device that is directly coupled to a single phy via this phy. An expression such as "link up" means a recovery of the link down (i.e., being able to communicate to the phy).

In addition, in the following description, such an expression as "the connection between an expander #x (or a controller) and an expander # (x+1) (a lower expander below the expander #x) is terminated" means inability to communicate from the expander #x (or the controller) to the expander # (x+1). Termination of a connection occurs when, for example, a cable that couples the expander #x (or the controller) and the expander # (x+1) to each other is cut or unplugged. When the expander #x (or the controller) and the expander # (x+1) are coupled to each other by a wide link and all of the phys coupled to the wide link are linked down, this means that the "termination" takes place.

Embodiment 1

Figure 2:
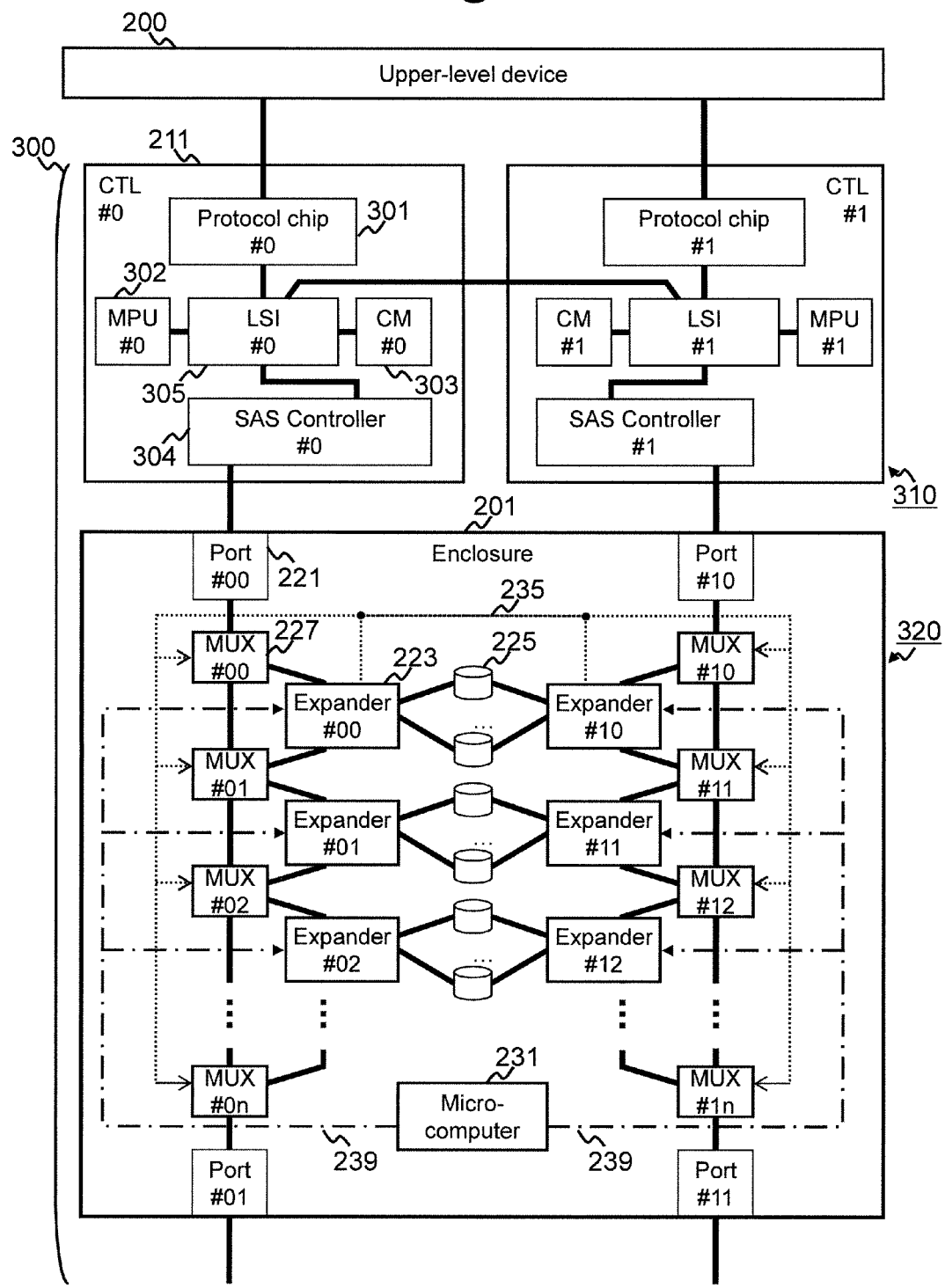
FIG. 2 shows an example of the configuration of a storage system according to Embodiment 1 of the present invention.

FIG. 2 shows an example of the configuration of a storage system according to Embodiment 1 of the present invention.

A storage system 300 is coupled to a higer-order divice 200. The higer-order divice 200 is, for example, a host computer or another storage system for issuing an I/O (Input/Output) command to the storage system 300.

The storage system 300 has a controller group 310 and a media drive group 320 that includes a plurality of media drives 225.

The controller group 310 has duplicated controllers ("CTL" hereinafter) 211, 211. Each CTL 211 is coupled to the higer-order divice 200, the media drive group 320, and the other CTL 211. Each CTL 211 receives an I/O command from the higer-order divice 200, and inputs/outputs data to/from one or more of the media drives 225 of the media drive group 320 in response to the received I/O command. Each CTL 211 has a communication interface apparatus, storage resource, and processors coupled thereto. In other words, for example, each CTL 211 has a protocol chip 301, MPU (Micro Processor Unit) 302, CM (Cache Memory) 303, SAS controller 304, and data transfer LSI (Large Scale Integration) 305. Note that, in FIG. 2, an identification number x is added to each of the components within a CTL #x.

The protocol chip 301 is an interface apparatus for communicating with the higer-order divice 200 and communicates with the higer-order divice 200 according to a predetermined protocol.

The MPU 302 carries out various processing steps by executing one or more computer programs. For example, the MPU 302 transmits various instructions to the SAS controller 304. One or more computer programs may be stored in the storage resource of each CTL 211, loaded from the storage resources, and executed by the MPU 302.

The CM 303 temporarily stores the data that are input/output to/from the media drives 225.

The SAS controller 304 executes processing according to the instructions from the MPU 302.

The data transfer LSI 305 is coupled to the elements 301, 302, 303 and 304 of the CTL 211 that has the LSI 305. The data transfer LSI 305 is also coupled to a data transfer LSI 305 within a LSI 305 different from the aforementioned LSI 305. A data transfer LSI 140 controls data transfer carried out among the elements in the CTL 211, as well as data transfer carried out between the CTLs 211.

One or more enclosures 201 have the plurality of media drives 225 of the media drive group 320. The one or more enclosures 201 are serially coupled, wherein the highest-order enclosure 201 is coupled to the SAS controller 304 of each CTL 211. Hereinafter, an example of one of the enclosures 201 is described.

The enclosure 201 has a plurality of ports 221, a plurality of MUXs (Multiplexer) 227, and a microcomputer 231. The enclosure 201 is configured so as to be able to expand expanders 223 and the media drives 225 in the enclosure 201. The enclosure 201 is also configured so as to be able to reduce the expanders 223 and media drives 225 from the enclosure 201. According to the example shown in FIG. 2, a single enclosure 201 has a plurality of the expanders 223 and a plurality of the media drives 225 at a certain point of time. Note that the media drives 225 are storage devices, such as HDDs (Hard Disk Drives) or SSDs (Solid State Drives) installed with SATAs (Serial Attached SCSIs) or SAS interfaces.

The CTL 211 or another enclosure 201 can be coupled to the ports 221. The plurality of ports 221 of the highest-order enclosure 201 include a upper-level port #00 coupled to a CTL #0 and a upper-level port #10 coupled to a CTL #1. When a lower-level enclosure is coupled to the highest-order enclosure 201, the plurality of ports 221 of the highest-order enclosure 201 further include a lower-level port #01 coupled to a lower-level enclosure and a lower-level port #11 coupled to the lower-level enclosure.

The storage system 300 has a first communication path, which is a path extending from the CTL #0 to each of the media drives 225, and a second communication path, which is a path extending from the CTL #1 to each of the media drives 225. The CTL #0 (#1) can input/output data to/from any I/O destination media drive 225 via the first communication path or the second communication path. The first and second communication paths are redundant communication paths. Therefore, the configuration of the first communication path and the configuration of the second communication path are substantially the same.

In one enclosure 201, the plurality of ports 221, the plurality of MUXs 227, and the plurality of expanders 223 are split into the first communication path and the second communication path. In the case of the example of the first communication path, the following is established. In other words, according to the example shown in FIG. 2, the components of the first communication path include the port #00 and two or more expanders #0q (q=0, 1, . . . ) that are serially coupled. Each of the expanders 223 is held between two MUXs #0p (p=0, 1, . . . ) and # (p+1). The highest-order MUX #00 is coupled to the upper-level port #00. In a single enclosure, the number of MUXs is greater than the maximum number of expanders by one.

Actual connection destinations of the MUXs 227 are switched. More specifically, the actual connection destinations of the MUXs 227 are upper-level and lower-level MUXs 227 (or lower-level or upper-level MUXs 227) or the upper-level and lower-level expanders 223 (or the lower-level or upper-level expander 223). In the case where the actual connection destinations of the MUXs 227 are the upper-level and lower-level MUXs 227 (or the lower-level or upper-levels MUX 227), the expander 223 existing between the MUX 227 and the MUX 227 higher or lower than the aforementioned MUX 227 is bypassed. Note that switching the actual connection destinations may be performed in units of expanders as described above, or may be performed in unit of phys instead. In the latter case, the actual connection destinations of the MUXs 227 are both the upper-level and/or lower-level MUXs 227 and the upper-level and/or lower-level expanders 223.

A MUX control line 235 is coupled to a MUX control expander in each of the communication paths. The MUX control line 235 is coupled to each MUX 227. Note that "MUX control expander" is an expander 223 that controls each MUX 227 by means of the MUX control line 235. In each communication path, at least one expander 223 (the highest-order expander 223, for example) is the MUX control expander. The MUX control expander switches the actual connection destinations of the MUXs from an expander to a MUX or from a MUX to an expander, by means of the MUX control line 235.

The microcomputer 231 manages any of a plurality of expander connectors (described hereinafter) to which the expanders 223 are coupled. More specifically, both of the first and second communication paths are provided with the plurality of expander connectors, wherein the microcomputer 231 is coupled to all of the expander connectors by expander connection lines 239 and stores information indicating any of the expander connectors to which the expanders 223 are coupled ("expander position management information" hereinafter). When the expanders 223 are coupled to the expander connectors (when the expanders 223 are expanded), and when the expanders 223 are removed from the expander connectors (when the expanders 223 are reduced), the microcomputer 231 detects the expansion or reduction of the expanders 223 and updates the expander position management information based on a result of the detection.

In the configuration shown in FIG. 2, suppose that a command addressed to a media drive coupled to an expander #02 ("target command" hereinafter in this paragraph) is issued from a SAS controller #0 of the CTL #0. If none of the expanders #00 to #02 is bypassed in the first communication path, the target command goes through the MUX #0, expander #00, MUX #01, expander #01, MUX #02 and expander #02. On the other hand, if the expander #01 of the expanders #00 to #02 is bypassed in the first communication path, the target command goes through the MUX #00, expander #00, MUX #01, MUX #02 and expander #02. In other words, the target command does not go through the expander #01. The media drive for which the target command is intended is a media drive based on the I/O command issued by the higer-order divice 200 (for example, a media drive based on a logical volume specified by the I/O command).

Figure 3:
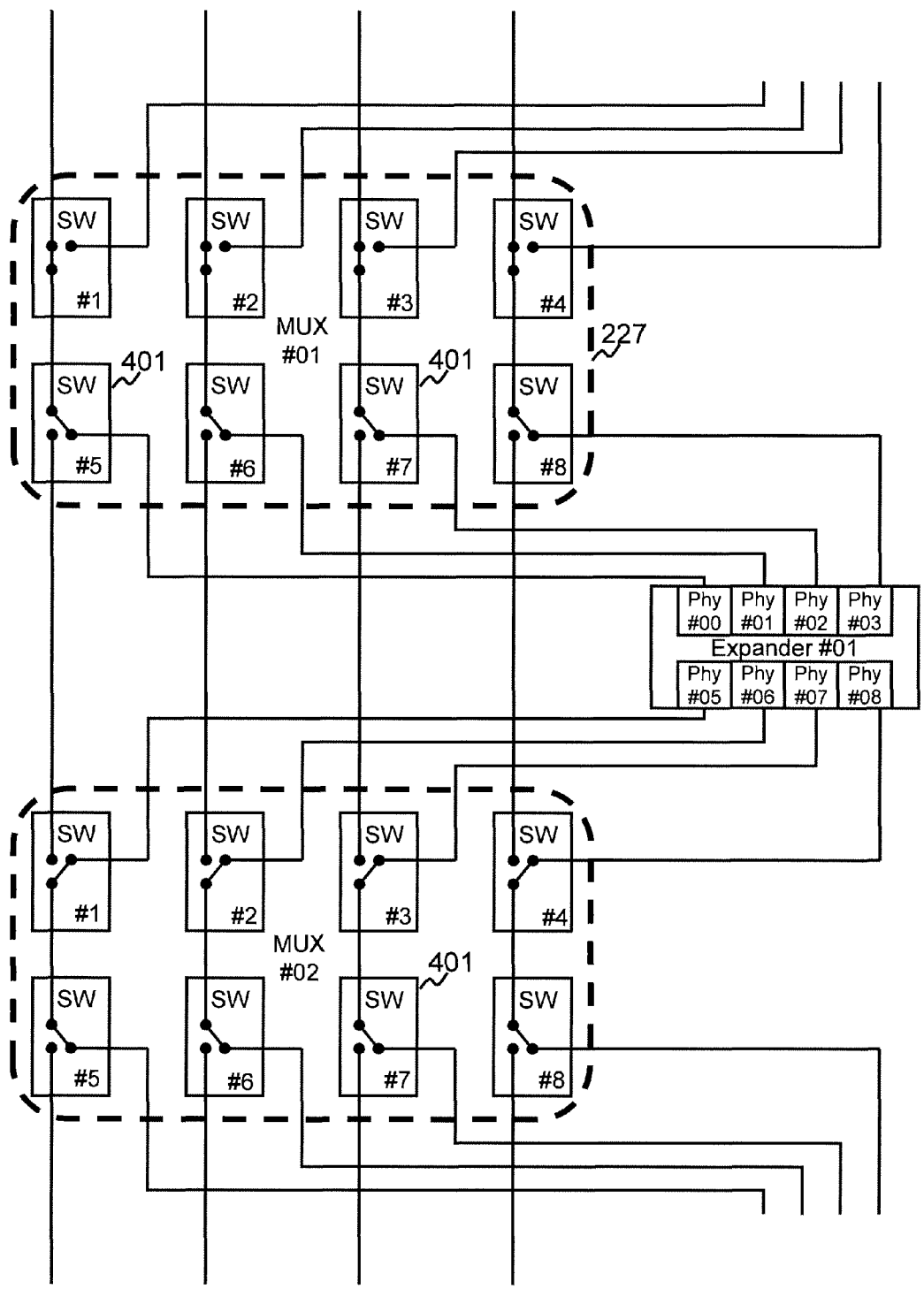
FIG. 3 shows an example of the internal configuration of a MUX 227.

FIG. 3 shows an example of the internal configurations of the MUXs 227.

Each MUX 227 has a plurality of switch modules 401. The plurality of switch modules 401 include, for example, two or more upper-level switch modules 401 coupled to two or more of the lower-level phys of the upper-level expander 223, and two or more lower-level switch modules 401 coupled to two or more of the upper-level phys of the lower-level expander 223. The two or more lower-level switch modules 401 (#5 to #8) are coupled to the two or more upper-level switch modules 401 (#1 to #4) respectively. In one enclosure, the upper-level port 221 of this enclosure is coupled to each of the upper-level switch modules 401 of the highest-order MUX, and the lower-level port 221 of this enclosure is coupled to each of the lower-level switch modules #401 of the lowest-order MUX.

FIG. 3 illustrates the MUXs #01 and #02 and the expander #01 between the MUXs #01 and #02. The upper-level phys #00 to #03 of the expander #01 are coupled to four lower-level switch modules #5 to h of the MUX #01 higher than the expander #01. The lower-level phys #04 to #07 of the expander #01 are coupled to four upper-level switch modules #1 to d of the MUX #02 lower than the expander #01.

Figure 4:
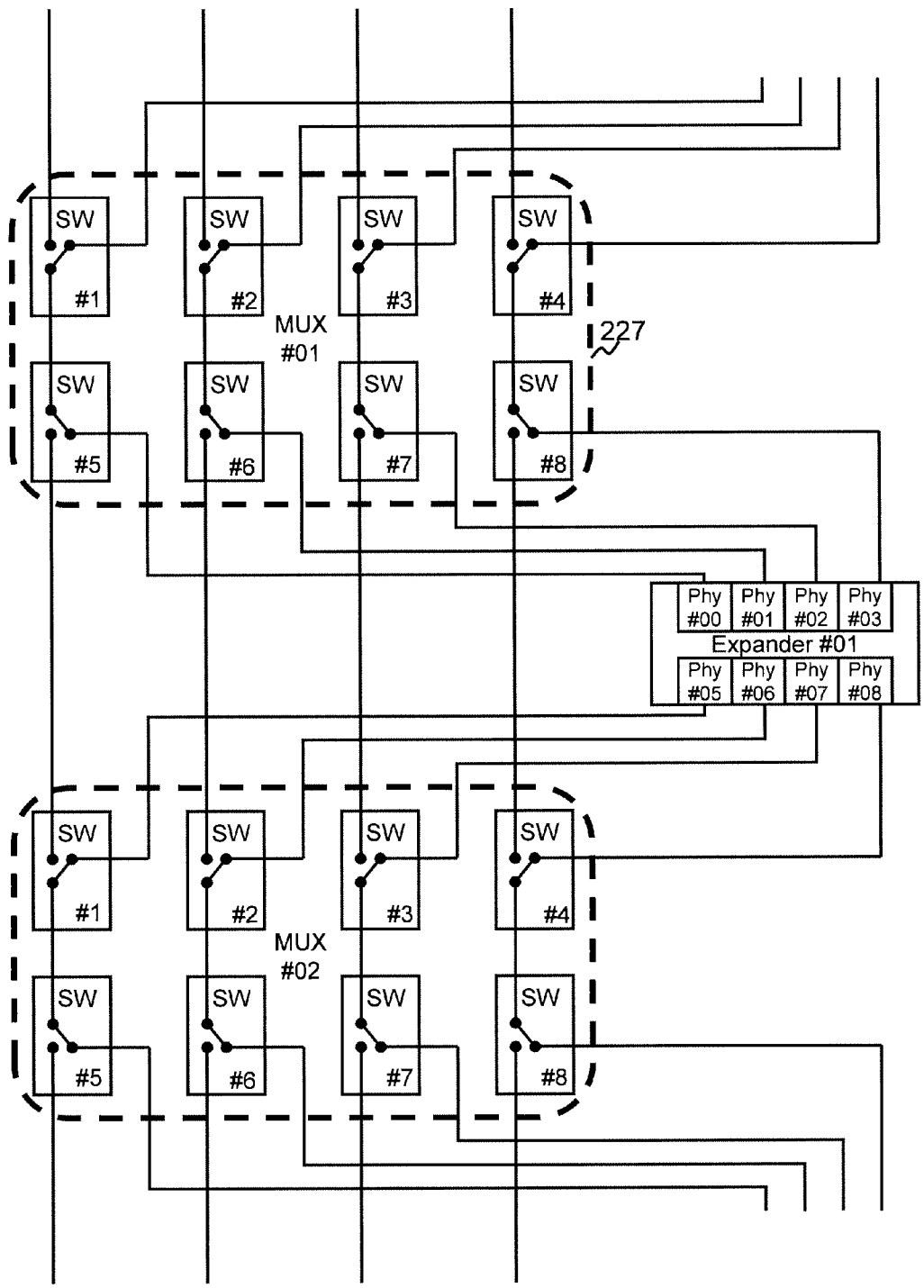
FIG. 4 shows an example of the internal configurations of MUX #01 and MUX #02, which do not bypass an expander #01.

When the expanders #00, #01 and #02 are serially coupled to each other, the connections shown in FIG. 4 are adopted.

The actual connection destination of the upper-level switch modules #1 to #4 of the MUX #01 is the expander #00 (not shown).

The actual connection destination of the lower-level switch modules #5 to #8 of the MUX #01 is the expander #01.

The actual connection destination of the upper-level switch modules #1 to #4 of the MUX #02 is the expander #01.

The actual connection destination of the lower-level switch modules #5 to #8 of the MUX #02 is the expander #02 (not shown).

Figure 5:
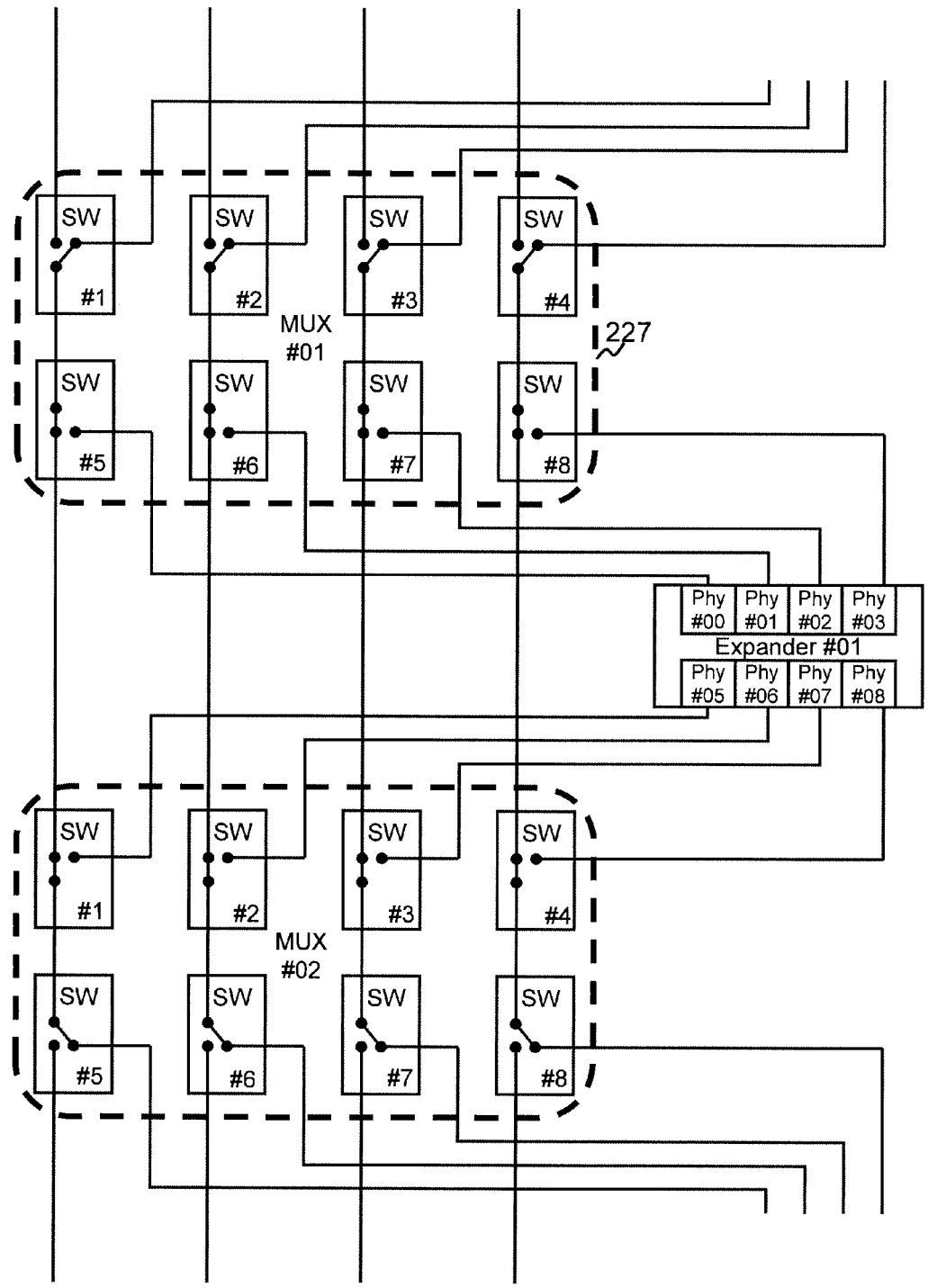
FIG. 5 shows an example of the internal configurations of the MUX #01 and MUX #02, which bypass the expander #01.

In the configuration shown in FIG. 4, when the expander #01 is bypassed, the connections shown in FIG. 5 are adopted.

The actual connection destination of the upper-level switch modules #1 to #4 of the MUX #01 still is the expander #00 (not shown).

The actual connection destination of the lower-level switch modules #5 to #8 of the MUX #01 is switched from the expander #01 to the MUX #02 therebelow.

The actual connection destination of the upper-level switch modules #1 to #4 of the MUX #02 is switched from the expander #01 to the MUX #01 thereabove.

The actual connection destination of the lower-level switch modules #5 to #8 of the MUX #02 still is the expander #02 (not shown).

By switching the connection destinations of the both MUXs holding a target expander therebetween from a target expander to either one of the MUXs as described above, this target expander can be bypassed.

Figure 6:
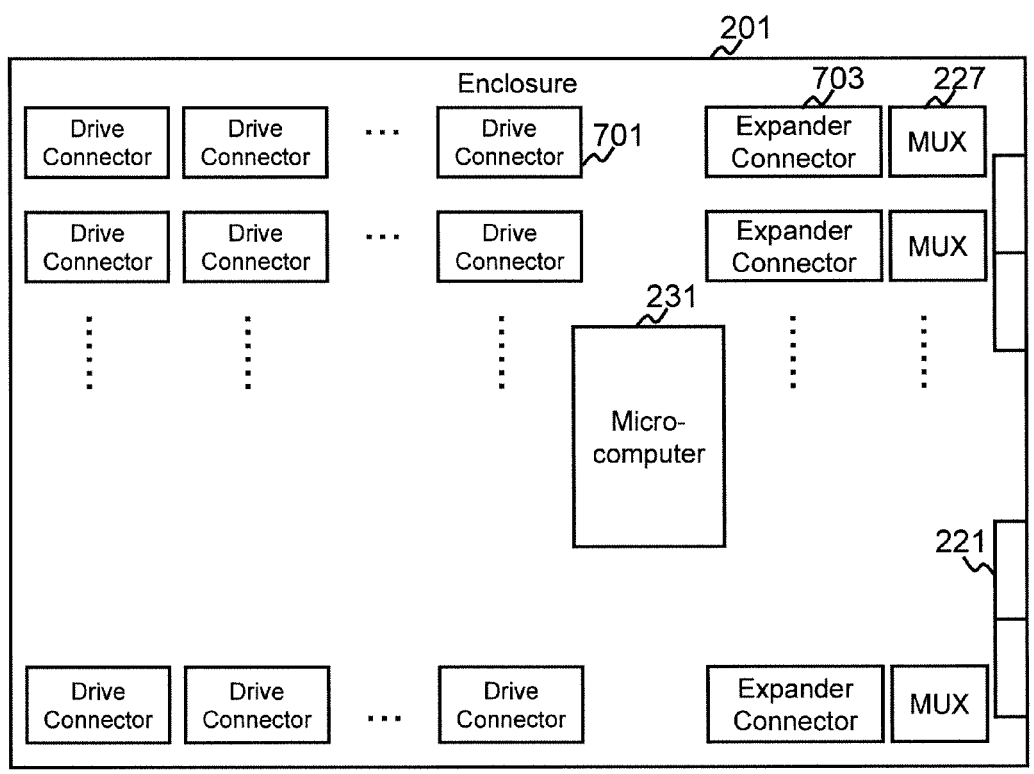
FIG. 6 shows an example of the configuration of an enclosure 201.

FIG. 6 shows an example of the configuration of the enclosure 201.

FIG. 6 illustrates the plurality of ports 221, the plurality of MUXs 227, and the microcomputer 231 as the above-described components of the enclosure 201. The enclosure 201 also has a plurality of drive connectors 701 and a plurality of expander connectors 703. A user can couple the media drives 225 to the drive connectors 701 or remove the media drives 225 from the drive connectors 701. The user can also couple the expanders 223 to the expander connectors 703 or remove the expanders 223 from the expander connector 703. In other words, the media drives 225 and the expanders 223 can be expanded or reduced.

Figure 7:
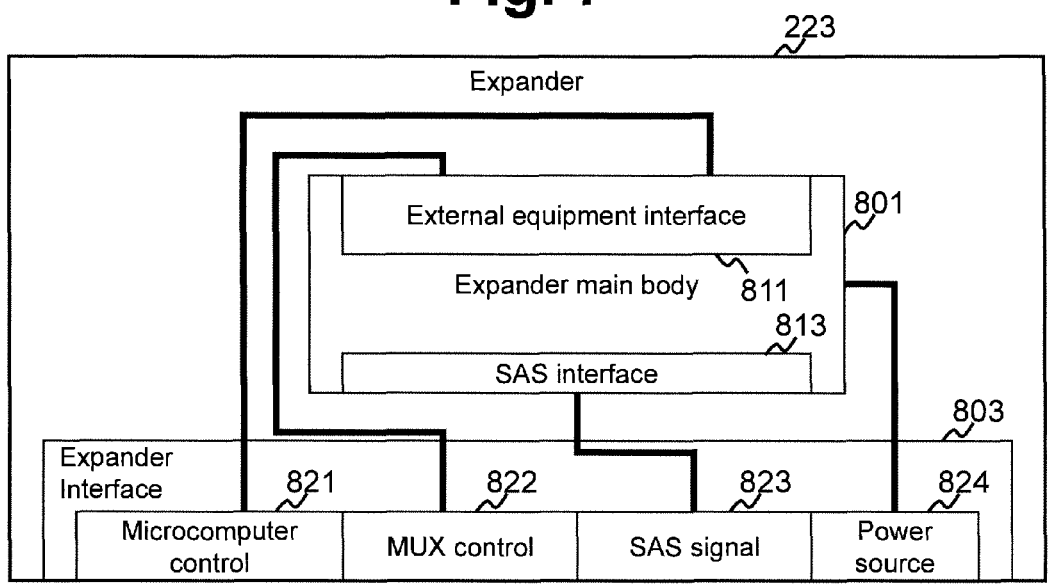
FIG. 7 shows an example of the configuration of an expander 223.

FIG. 7 shows an example of the configuration of one of the expanders 223.

The expander 223 has an expander interface 803 and an expander main body 801 coupled to the expander interface 803.

The expander interface 803 is an interface apparatus coupled to the expander connector 703. The expander interface 803 has a microcomputer control interface 821, MUX control interface 822, SAS signal interface 823, and power source interface 824.

The microcomputer control interface 821 is an interface apparatus that outputs a signal to the microcomputer 231 when the expanders 223 are coupled to the expander connectors 703. Therefore, the microcomputer 231 can detect that the expanders 223 are coupled to the expander connectors 703.

The MUX control interface 822 is an interface apparatus that outputs a signal for controlling the MUXs.

The SAS signal interface 823 is an interface apparatus that inputs/outputs a command according to a SAS.

The power source interface 824 is an interface apparatus that receives supply of electrical power from a power source (not shown). The power source interface 824 is coupled to the expander main body 801.

The expander main body 801 has an external equipment interface 811 and SAS interface 813. The external equipment interface 811 is an interface apparatus for equipment other than the expanders and is coupled to the microcomputer control interface 821 and the MUX control interface 822. The SAS interface 813 includes a plurality of phys and is coupled to the SAS signal interface 823. The expander main body 801 receives commands according to the SAS from the upper-level phys of the plurality of phys and carries out routing processing on the commands (processing for outputting the commands from the phys that are coupled to the destinations of the commands.)

A plurality of types of tables that are used in the present embodiment are described below. Note that the plurality of devices associated with the first communication path (MPU #0, SAS controller #0 and expanders #0$q$) and the plurality of devices associated with the second communication path have the plurality of types of tables. The various tables are described hereinafter with respect to the plurality of devices associated with the first communication path.

Figure 8A:
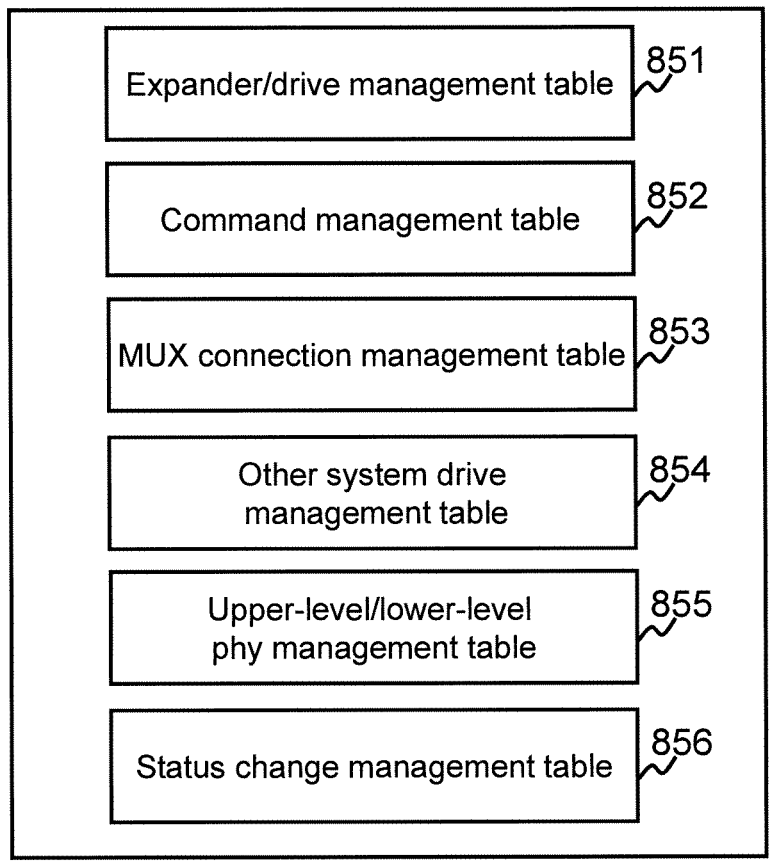
FIG. 8A shows an example of information used by a MPU #0.

FIG. 8A shows an example of information used by the MPU #0.

The MPU #0 uses the following tables:

An expander/drive management table 851 that has information on the plurality of expanders and plurality of media drives associated with the first and second communication paths;

A command management table 852 that has information indicating the states of issued commands;

A MUX connection management table 853 that has information on the connection destinations of the MUXs;

A exterior system drive management table 854 that has information on the media drives of the exterior system (in this example, the media drives that are accessed through the second communication path);

A upper-level/lower-level phy management table 855 that has information on the high-order phys and lower-level phys of the plurality of expanders; and A status change management table 856 that has information indicating the number of times the status of each phy is changed.

These tables are stored in the storage resource of the CTL #0 (the MPU #0, for example). These tables are described hereinafter.

Figure 8B:
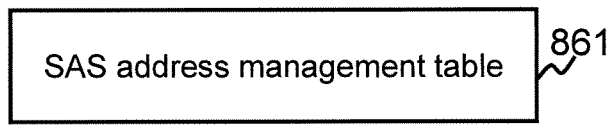
FIG. 8B shows an example of information used by a SAS controller #0.

FIG. 8B shows an example of information used by the SAS controller #0.

The SAS controller #0 has a SAS address management table 861. This table 861 is stored in the storage resource of the CTL #0 (the MPU #0, for example). The address management table 861 has SAS addresses of all of the expanders #0$q$ present in the lower-level of the SAS controller #0 and of the storage devices. The table 861 may have SAS addresses of all expanders #1$q$. The table 861 may be a table used by the SAS controller within a general SAS storage system.

Figure 8C:
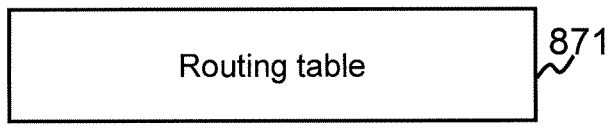
FIG. 8C shows an example of information used by an expander #0q.

FIG. 8C shows an example of information used by the expander #0$q$.

Each of the expanders #0$q$ has a routing table 871. This table 871 is stored in the storage resource of this expander #0$q$. This table 871 has, for example, the following information:

The SAS addresses of all of the expanders below the expander #0$q$;

The SAS addresses of the media drives that are directly coupled to the direct phys of the expander #0$q$, the SAS addresses corresponding to these phys;

The SAS address of each of the media drives that are indirectly coupled to the indirect phys (lower-level phys) of the expander #0$q$, the SAS addresses corresponding to these phys; and Information indicating the number of times the status of each of the phys of the expander #0$q$ is changed.

This table 871 may be a table used by each expander of the general SAS storage system.

FIG. 9 shows an example of the configuration of the expander/drive management table 851.

The expander/drive management table 851 has the SAS addresses of all of the expanders and media drives that are associated with the first and second communication paths. More specifically, the table 851 has, for example, the following information for each of the phys:

A path number 901, which is an identification number of the communication path through which the expanders with phys pass;

A column number 902, which is an order from the CTLs of the expanders having the phys;

A SAS address 903, which is the SAS addresses of the expanders having the phys;

A phy number 904, which is the number of each phy;

A base system SAS address 905, which is the SAS address of the base system of each of the media drives that are directly coupled to the phys; and An exterior system SAS address 906, which is the SAS address of the exterior system of each of the media drives that are directly coupled to the phys.

The column number 902 of the highest-order expander is "1." Furthermore, the path number 901 "1" means the first communication path, in which case the first communication path belongs to the base system and the second communication path to the exterior system. On the contrary, the path number 901 "2" means the second communication path, in which case the second communication path belongs to the base system and the first communication path to the exterior system.

FIG. 10 shows an example of the configuration of the command management table 852.

The command management table 852 has the following information for each of commands that are output from the SAS controller #0 (and the SAS controller #1):

A command number 1001 representing an order of issuance of the commands output from the SAS controller #0 (#1);

A command 1002 (1004), which is information indicating the type of command output from the SAS controller #0 (#1); and A state 1003 (1005), which is information indicating the state of each command output from the SAS controller #0 (#1).

Figure 11B:
FIG. 11B shows the other part of the example of the configuration of a MUX connection management table 853.

FIG. 11 shows an example of the configuration of the MUX connection management table 853.

The MUX connection management table 853 has the following information for each MUX #0$p$ (#1$p$) through which the first communication path (and the second communication path) passes:

A ENC number 1111, which is the number of an enclosure having the MUX #0$p$ (#1$p$);

An expander SAS address 1112 (1115), which is the SAS address of the MUX control expander controlling the MUX #0$p$ (#1$p$);

A MUX number 1113 (1116) representing the number of the MUX #0$p$ (#1$p$);

A SW number 114$a$ (1117$a$) being the number of each switch module of the MUX #0$p$ (#1$p$); and A SW connection destination 1114$b$ (1117$b$) representing a kind of a device to which each switch module of the MUX #0$p$ (#1$p$) is coupled.

When the SW connection destination 1114$b$ (1117$b$) is "expander," then the connection destination is an expander. When the SW connection destination 1114$b$ (1117$b$) is "lower-level," then the connection destination is a lower-level MUX (switch module) or port. When the SW connection destination 1114$b$ (1117$b$) is "upper-level", then the connection destination is a upper-level MUX (switch module) or port.

According to the example shown in FIG. 11, the following facts are clarified:

In the enclosure #0, the expander having "Expander 00 SAS Address" as the address 1112 is the MUX control expander of the first communication path, and the expander having "Expander 10 SAS Address" as the address 1115 is the MUX control expander of the second communication path; and In the enclosure #0, because the SW connection destination 1114$b$ of the switch modules #5 to #8 of the MUX #01 and of the switch modules #1 to #4 of the MUX #02 is "expander" in the first communication path, the expander #01 is not bypassed.

Since in the enclosure #0, in the first communication path, the connection destination 1114$b$ of the switch modules #5 to #8 of the MUX #02 is "lower-level" and the connection destination 1114$b$ of the switch modules #1 to #4 of the MUX #03 is "upper-level", the expander #02 is bypassed.

Figure 12:
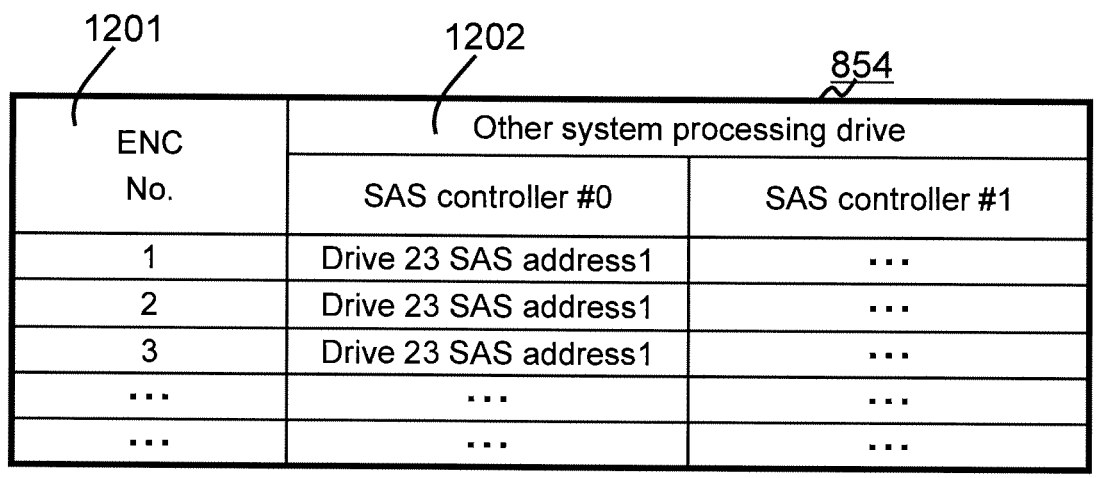
FIG. 12 shows an example of the configuration of a exterior system drive management table 854.

FIG. 12 shows an example of the configuration of the exterior system drive management table 854.

The exterior system drive management table 854 has the SAS addresses of the media drives to be processed in the exterior system with respect to the SAS controller #0 (#1). It is clear from the example shown in FIG. 12 that when a command is transmitted from the SAS controller #0 to the SAS address "Drive 23 SAS Address 1," this command is transmitted from the SAS controller #1 instead of the SAS controller #0.

FIG. 13 shows an example of the configuration of the upper-level/lower-level phy management table 855.

The upper-level/lower-level phy management table 855 has the following information for each expander:

An expander number 1301 indicating the number of each expander; and

A upper-level/lower-level phy number group 1302 indicating the numbers of all of the upper-level phys and the lower-level phys of each expander.

FIG. 14 shows an example of the configuration of the status change management table 856.

The status change management table 856 has the following information for each expander:

An expander number 1401 indicating the number of each expander; and

A status change number information 1402 indicating the number of times the status of each phy of each expander is changed.

Each of the expanders counts the number of times the status of each phy is changed, and stores the information indicating the counted number. When each of the expanders receives a number notification command (a command according to the SAS) from the SAS controller, the number of times the status of each phy of this expander is changed is notified to the SAS controller. The status change number information 1402 for each expander that is recorded in the status change management table 856 is information indicating the number of times the status is changed, which is collected (notified) from each expander. The status may be changed only when an error (link down, for example) occurs, or when the error is recovered (linked up, for example) instead or in addition thereto.

The flows of the processing steps that are carried out in the present embodiment are described hereinafter. In the present embodiment, when expansion of the expanders is detected while the storage system 300 is activated, expander expansion processing is carried out. When failure is detected in any of the expanders, expander failure handling processing is carried out.

Figure 15:
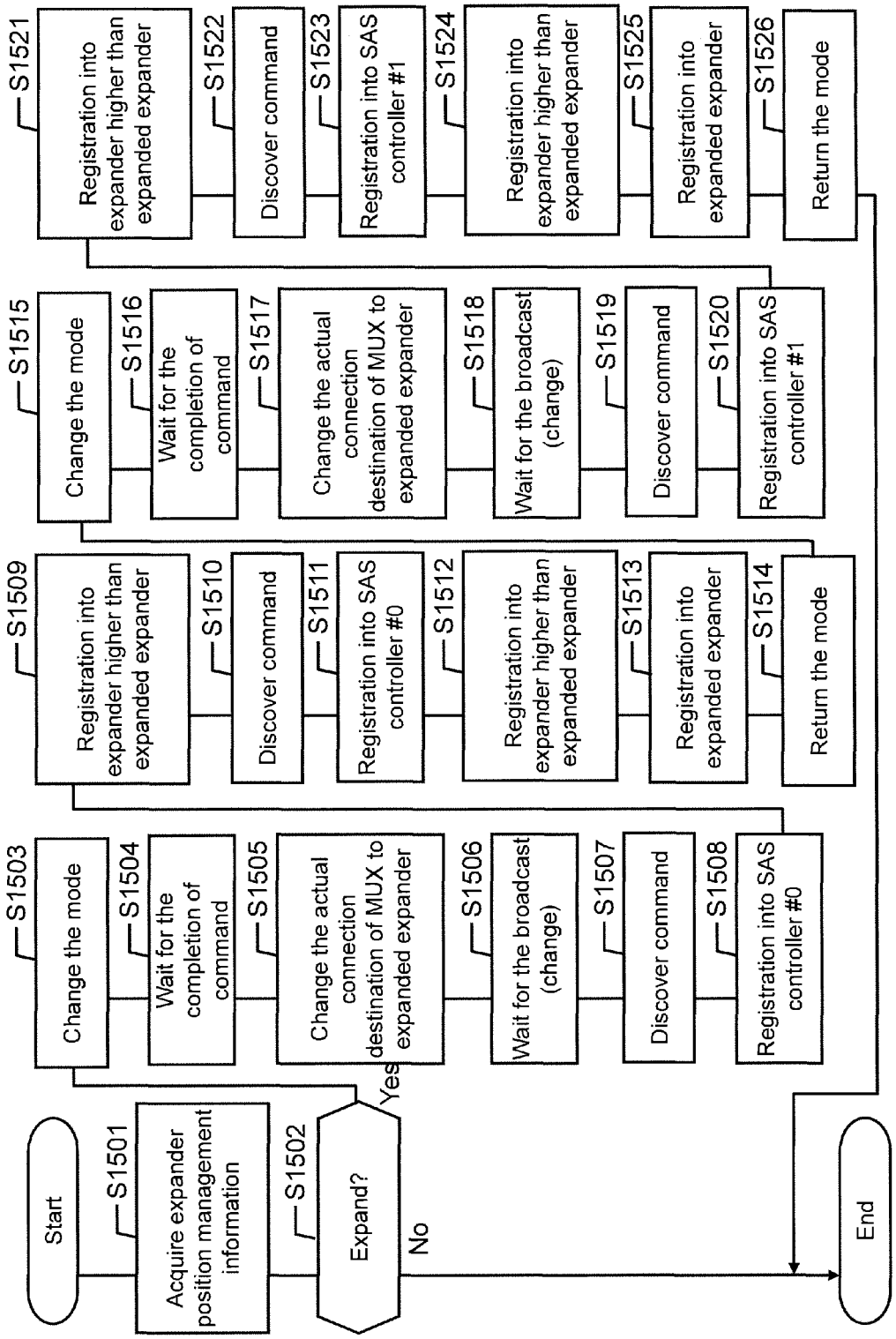
FIG. 15 shows a flow of processing including expander expansion processing.

FIG. 15 shows a flow of processing including the expander expansion processing. This processing is started regularly (or irregularly) by the MPU #0 or according to an instruction from the user.

In S1501, the MPU #0 instructs the SAS controller #0 to issue a request for reading the expander position management information. In response to this instruction, the SAS controller #0 transmits to the highest-order expander #00 (or may be another expander #0$q$) the request for reading the expander position management information. The expander #00 that has received this request requests the microcomputer 231 for the expander position management information. In response to this request, the microcomputer 231 transmits the expander position management information to the expander #00. The expander #00 receives the expander position management information and transmits the information to the SAS controller #0. The SAS controller #0 receives the expander position management information and transmits the information to the MPU #0.

In S1502, the MPU #0 determines whether the expanders #0$p$ and #1$p$ are expanded or not. More specifically, the MPU #0 compares the expander position management information that is received in the previous processing shown in FIG. 15 with the expander position management information that is received in S1501, to determine whether the expanders #0$p$ and #1$p$ are expanded or not. Each of the expanders is expanded in the form of a pair, for example. In other words, the duplicated expanders are expanded.

When the result of the determination made in S1502 is negative (S1502: No), this processing ends.

When the result of the determination made in S1502 is positive (S1502: Yes), expander expansion processing configured by S1503 to S1526 is carried out. In order to clarify the following description, the expanded expanders are supposedly the expanders #01 (and #11) accordingly.

In S1503, when the MPU #0 receives an I/O command from the higer-order device 200, the MPU #0 changes a data transfer control mode to a mode for transferring the I/O command to the other CTL #1 (for instance, when the I/O command is received from the higer-order device 200, the mode before change is a mode for processing the I/O command in the CTL #0). As a result, the I/O commands received from the higer-order device 200 by the CTL #0 subsequent to S1503 is transferred to the CTL #1 without being processed by the CTL #0 (in other words, the command is not issued from the CTL #0 to the storage device via the SAS controller #0). Specifically, the I/O command that is received from the higer-order divice 200 by the CTL #0 is transferred from a data transfer LSI #0 to a data transfer LSI #1. The CTL #1 that has received the I/O command can issue a write command or a read command to the media drives, which are the destinations of the I/O command, via the second communication path.

In S1504, the MPU #0 waits for the completion of all of the commands that are output from the SAS controller #0. More specifically, the MPU #0 waits for the completion of all of the commands whose states 1003 indicate "issued" for the SAS controller #0 in the command management table 852. A step S1505 is carried after the completion of all of the commands.

In S1505, the actual connection destination of the two MUXs #01 and #02 holding the expanded expander #01 therebetween is changed to the expanded expander #01. More specifically, for example, the following processing steps are carried out. In other words, the MPU #0 instructs the SAS controller #0 to issue a command for changing the actual connection destination of the MUX #01 and #02 to the expanded expander #01 ("connection destination changing command" hereinafter). In response to this instruction, the SAS controller #0 transmits the connection destination changing command to the MUX control expander #00. The MUX control expander #00 receives the connection destination changing command, and, in response to this command, changes the actual connection destination of the MUXs #01 and #02 to the expanded expander #01 through the MUX control line 235. As a result, the actual connection destination of the switch modules #5 to #8 in the lower-level of the MUX #01 is changed from the MUX #02 to the expanded expander #01, and the actual connection destination of the switch modules #1 to #4 in the upper-level of the MUX #02 is changed from the MUX #01 to the expanded expander #01.

In S1505, the expanded expander #01 is coupled to the expander #00. In this case, the expander #00 one above the expanded expander #01 broadcasts predetermined information (Broadcast (change)). In other words, the broadcast (change) is transmitted to both the upper-level and lower-level of the expander #00.

In S1506, the MPU #0 waits until the SAS controller #0 receives the broadcast (change). When the SAS controller #0 receives the broadcast (change), a step S1507 is carried out.

In S1507, the MPU #0 instructs the SAS controller #0 to transmit a discover command to the expander #00 one above the expanded expander #01. In response to this instruction, the SAS controller #0 transmits the discover command to the expander #00. In response to this discover command, the SAS controller #0 receives, from the expander #00, information on the expanded expander #01 coupled to the phys in the lower-level of the expander #00 (e.g., the SAS address of the expanded expander #01).

In S1508, the MPU #0 registers the information received in S1507 (the SAS address of the expanded expander #01, for example), into the SAS controller #0 (the SAS address management table 861). The MPU #0 may also update at least the tables 851, 853, 855 and 856 of the tables 851 to 856 shown in FIG. 8A, on the basis of the information.

In S1509, the MPU #0 instructs the SAS controller #0 to register the information received in S1507 (the SAS address of the expanded expander #01, for example), into all of the expanders above the expanded expander #01. In response to this instruction, the SAS controller #0 issues a command for registering the information received in S1507 (the SAS address of the expanded expander #01, for example), to all of the expanders above the expanded expander #01 (the routing table, for example). Consequently, the information received in S1507 is registered into all of the expanders above the expanded expander #01.

In S1510, the MPU #0 instructs the SAS controller #0 to transmit the discover command to the expanded expander #01. The SAS controller #0 uses the information registered in S1508 (the SAS address of the expanded expander #01, for example), to transmit the discover command to the expanded expander #01. In response to this discover command, the SAS controller #0 receives information on the expanded expander #01. The information includes, for example, information indicating a device with a certain SAS address that is coupled to a certain phy of the expanded expander #01. Therefore, in S1510, the information on the expanded expander #01 includes the SAS addresses of the media drives that are directly coupled to the expanded expander #01.

In S1511, the MPU #0 registers the information received in S1510 by the SAS controller #0, into the SAS controller #0 (the SAS address management table 861). The MPU #0 may also update at least the table 851 of the tables 851 to 856 shown in FIG. 8A, on the basis of the information.

In S1512, the MPU #0 instructs the SAS controller #0 to register the information received in S1510 (e.g., the SAS addresses of the devices (media drives) coupled to the expanded expander #01), into all of the expanders above the expanded expander #01. In response to the instruction, the SAS controller #0 issues a command for registering the information received in S1510 (e.g., the SAS addresses of the devices (media drives) coupled to the expanded expander #01), into all of the expanders (e.g., the routing table) above the expanded expanders #01. Consequently, the information received in S1510 is registered into all of the expanders above the expanded expander #01.

In S1513, the MPU #0 instructs the SAS controller #0 to register the information on all of the devices (expanders and drives) below the expanded expander #01 (e.g., the information indicating a certain device with a certain SAS device that is directly or indirectly coupled to a certain lower-level expander). In response to the instruction, the SAS controller #0 issues a command for registering the information on all of the devices (expanders and drives) below the expanded expander #01, into the expanded expander #01 (e.g., the routing table). Consequently, the information on all of the devices (expanders and drives) below the expanded expander #01 is registered into the expanded expander #01.

In S1514, the MPU #0 returns the data transfer control mode. As a result, the I/O commands that are received from the higer-order divice 200 by the CTL #0 subsequent to S1514 are processed by the CTL #0. In other words, commands are issued from the CTL #0 to the storage device via the SAS controller #0.

Thereafter, the same processing steps as S1503 to S1514 are carried out by the CTL #1 (S1515 to S1526). In other words, the processing involving the expanded expander #11 is carried out by the MPU #1 and the SAS controller #1. For example, the following reading is performed to describe S1503 to S1514:

Reading "MPU #0" as "MPU #1";
Reading "SAS controller #0" as "SAS controller #1";
Reading "MUX #0*p*" as "MUX #1*p*"; and
Reading "expander #0*q*" as "expander #1*q*."

In this manner, S1515 to S1526 can be understood.

The above has described the processing steps including the expander expansion processing. According to the description of FIG. 15, the expander expansion processing can be performed while continuing the processing of the I/O commands issued by the higer-order divice 200 (without stopping the issuance of the commands on the back-end).

Note that the SAS controller #0 (#1) does not need to send the instructions to the MUX #0*p* (#1*q*) through the expander

0q (#1q). However, the following effects are considered to be obtained by allowing the instructions to go through the expander #0q (#1q) in the present embodiment.

In other words, if the SAS controller #0 (#1) controls the MUX #0p (#1q) without using the expander #0q (#1q), not only a data transfer line that connects the SAS controller #0 (#1) and the expander #0q (#1q) to each other (a line through which the commands according to the SAS standard and data to be input/output to/from the storage devices flow), but also a special control line for connecting the SAS controller #0 (#1) and the MUX #0p (#1p) to each other need to be coupled to the SAS controller #0 (#1). Only the expanders can control the commands that are transmitted according to the SAS standard. For this reason, when an instruction is sent to the MUX #0p (#1q) via the expander #0q (#1q), the SAS controller #0 (#1) can use the commands according to the SAS standard to instruct the expander #0q (#1q) to control the MUXs. Therefore, it is no necessary to couple the special control line to the SAS controller #0 (#1), and the commands according to the SAS standard can be utilized in order to output the instruction for controlling the MUXs. Thus, the design of the SAS controller does not have to be changed significantly.

Figure 16:
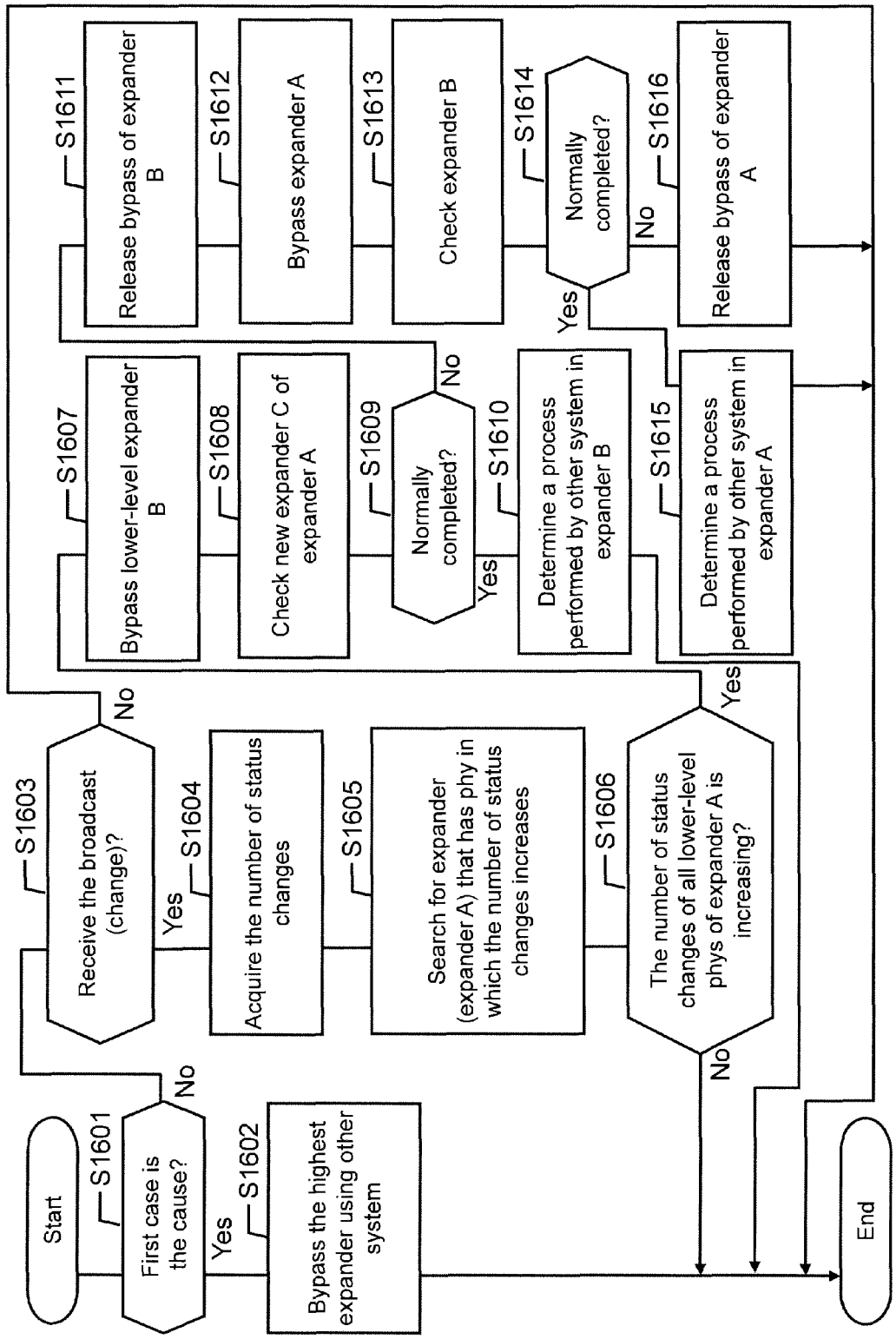
FIG. 16 shows a flow of expander failure handling processing.

FIG. 16 shows a flow of the expander failure handling processing. This processing is started when the MPU receives error occurrence information from the SAS controller. Hereinafter, there is a first case in which the error occurrence information is issued from the SAS controller, and a second case in which the error occurrence information is broadcasted from the expander. In the first case, for example, the connection between the SAS controller and the highest-order expander is terminated (or failure occurs in the highest-order expander). In the second case, the expander detects the failure. The flow of the processing shown in FIG. 16 is described under assumption that the MPU #0 receives the error occurrence information.

In S1601, the MPU #0 determines, based on the received error occurrence information, whether this information occurs due to the first case or not. When the result of the determination made in S1601 is positive (S1601: Yes), a step S1602 is carried out. When the result of the determination made in S1601 is negative (S1601: No), a step S1603 is carried out.

In S1602, the actual connection destination of the MUX #00 (#01) from the CTL #0 through the CTL #1 and the MUX control expander #10 is changed from the expander #00 to the MUX #01 (#00). In other words, the expander #00 is bypassed by the exterior system. More specifically, for example, the following processing steps are performed:

The MPU #0 instructs the MPU #1 to change the actual connection destination of the MUXs #00 and #01;

In response to the instruction, the MPU #1 instructs the SAS controller #1 to transmit a command for changing the actual connection destination of the MUXs #00 and #01;

In response to the instruction, the SAS controller #1 transmits the command for changing the actual connection destination of the MUXs #00 and #01 (the command according to the SAS), to the MUX control expander #10; and In response to this command, the MUX control expander #10 changes the actual connection destination of the MUXs #00 (#01) from the expander #00 to the MUX #01 (#00) through the MUX control line 235.

In S1603, the MPU #0 determines, based on the received error occurrence information, whether this information occurs due to the second case (that is, the information broadcasted from any of the expanders #0q). When the result of the determination made in S1603 is positive (S1603: Yes), a step S1604 is carried out.

In S1604, the MPU #0 instructs the SAS controller #0 to issue a command for being notified by all of the expanders #0q of the number of times the status of each phy is changed ("number notification command" hereinafter). In response to the instruction, the SAS controller #0 transmits the number notification command to all of the expanders #0q. The MPU #0 then receives, through the SAS controller #0, the notification of the number of times the status of each phy of each of the all expanders #0q is changed.

In S1605, the MPU #0 compares (a) with (b) described below:
(a) The number of times the status of each phy is changed, which is received in S1604; and
(b) The number of times the status of each phy is changed, which is possessed by the status change management table 856.

Accordingly, the MPU #0 searches for an expander that has a phy whose status change number is increased.

In S1606, the MPU #0 determines, based on (a) and (b) of S1605, whether the status change number of each of all of the lower-level phys possessed by the expander specified in S1605 ("expander #01" in the description of FIG. 16) is increased or not. When the result of the determination made in S1606 is positive (S1606: Yes), a step S1607 is carried out. This is because all of a plurality of links (four, for example) connecting the expander #01 and the expander #02 therebelow to each other are linked down, and, for this reason, no command can be transmitted from the expander #01 to the expander #02 through any of the links. When, on the other hand, the result of the determination made in S1606 is negative (S1606: No), the step S1607 is not carried out. This is because a command can be transmitted from the expander #01 to the expander #02 through at least one link between the expander #01 and the expander #02.

In S1607, the expander #01 is bypassed by the base system. More specifically, the MPU #0 instructs the SAS controller #0 to transmit a command for changing the actual connection destination of the MUXs #01 and #02. In response to this instruction, the SAS controller #0 transmits, to the MUX control expander #00, the command for changing the actual connection destination of the MUXs #01 and #02 (the command according to the SAS). In response to this command, the MUX control expander #00 changes the actual connection destination of the MUX #01 (#02) from the expander #01 to the MUX #02 (#01) through the MUX control line 235.

In S1608, the MPU #0 instructs the SAS controller #0 to issue a command for checking the state of a new expander #02 immediately below the expander #00 ("TEST UNIT READY command" hereinafter), to the expander #02. In response to this instruction, the SAS controller #0 transmits the TEST UNIT READY command to the expander #02. The expander #02 executes the processing according to this command, if possible, and transmits thus obtained response to the SAS controller #0.

In S1609, the MPU #0 determines whether the command transmitted in S1608 is normally completed or not. This determination is made based on, for example, whether a response is received within a certain period of time since the transmission of the command in S1608, or whether the response transmitted in S1608 is normally completed or not. When the result of the determination made in S1609 is positive (S1609: Yes), a step S1610 is carried out. This is because only the media drives that are coupled to the expander #01 may be accessed from the exterior system. On the other hand, when the result of the determination made in S1609 is negative (S1609: No), a step S1611 is carried out. This is because the expander #01 itself does not necessarily have a problem (in this case, for example, the links that are coupled to the expander #01 (or the phys in the lower-level of the expander #00) might have a problem).

In S1610, the MPU #0 performs setting such that an I/O command is transmitted to the media drives coupled to the expander #01, through the exterior system. More specifically, for example, the MPU #0 registers, as the exterior system SAS address of the SAS controller #0, the exterior system SAS addresses (the exterior system SAS addresses that can be specified from the expander/drive management table 851) of all of the media drives coupled to the expander #01, into the exterior system drive management table 854.

In S1611, the bypass of the expander #01 is canceled by the base system. More specifically, the MPU #0 instructs the SAS controller #0 to transmit a command for changing the actual connection destination of the MUXs #01 and #02. In response to this instruction, the SAS controller #0 transmits the command for changing the actual connection destination of the MUXs #01 and #02, to the MUX control expander #00 (the command according to the SAS). In accordance with this command, the MUX control expander #00 changes the actual connection destination of the MUX #01 (#02) from the MUX #02 (#01) to the expander #01 through the MUX control line 235.

In S1612, the expander #00 immediately above the expander #01 is bypassed by the base system. More specifically, the MPU #0 instructs the SAS controller #0 to transmit a command for changing the actual connection destination of the MUXs #00 and #01. In response to this instruction, the SAS controller #0 transmits the command for changing the actual connection destination of the MUXs #00 and #01 (the command according to the SAS), to the MUX control expander #00. In response to this command, the MUX control expander #00 changes the actual connection destination of the MUX #00 (#01) from the expander #00 to the MUX #01 (#00) through the MUX control line 235.

In S1613, the MPU #0 instructs the SAS controller #0 to issue the TEST UNIT READY command for checking the state of the expander #01, to the expander #01. This is because the expander #01 itself might not have any problem. In response to this instruction, the SAS controller #0 transmits the TEST UNIT READY command to the expander #01. The expander #01 then executes the processing according to this command, if possible, and transmits thus obtained response to the SAS controller #0.

In S1614, the MPU #0 determines whether the command transmitted in S1613 is normally completed or not. The method of determination is the same as that of S1609. When the result of the determination made in S1614 is positive (S1614: Yes), a step of S1615 is carried out. This is because the media drives that are coupled to the expander #00 may need to be accessed from the exterior system. On the other hand, when the result of the determination made in S1614 is negative (S1614: No), a step S1616 is carried out.

In S1615, the MPU #0 performs setting such that an I/O command is transmitted to the media drives coupled to the expander #00, via the exterior system. More specifically, for example, the MPU #0 registers, as the exterior system SAS address of the SAS controller #0, the exterior system SAS address of all of the media drives coupled to the expander #00 in the exterior system drive management table 854.

In S1616, the bypass of the expander #00 is canceled by the base system. More specifically, the MPU #0 instructs the SAS controller #0 to transmit a command for changing the actual connection destination of the MUXs #00 and #01. In response to this instruction, the SAS controller #0 transmits the command for changing the actual connection destination of the MUXs #00 and #01 (the command according to the SAS), to the MUX control expander #00. In response to this command, the MUX control expander #00 changes the actual connection destination of the MUXs #00 (#01) from the MUX #01 (#00) to the expander #00 through the MUX control line 235.

According to the flow shown in FIG. 16, the expander #01 is bypassed regardless of whether the expander #01 itself has a problem when the result of S1616 is "Yes." The TEST UNIT READY command may be transmitted to the expander #01 without having the expander #01 bypassed. However, as shown in FIG. 16, bypassing the expander #01 regardless of the presence/absence of a problem in the expander #01 itself is considered efficient.

As described above, according to Embodiment 1, the MUXs are provided in the upper-level and the lower-level of expanders. When failure occurs in any of the expanders, the actual connection destination of the MUXs in the upper-level and the lower-level the failed expander is changed from the failed expander to a MUX, whereby the failed expander can be bypassed.

According to Embodiment 1, each of the enclosures 201 has a plurality of expander connectors, and the expanders can be expanded/reduced after activating the storage system. When one of the expanders is expanded, the actual connection destination of the MUXs in the upper-level and the lower-level of the expanded expander can be changed from the MUX to the expanded expander. Accordingly, the expanded expander can be included in two or more expanders that are serially coupled to each other.

Furthermore, according to Embodiment 1, the expander expansion processing and the expander failure handling processing can be performed without stopping receiving the I/O commands from the host device.

Embodiment 2

Embodiment 2 of the present invention is described hereinafter. In so doing, the differences with Embodiment 1 are mainly described, and the description of the similarities with Embodiment 1 is omitted or simplified.

Figure 17:
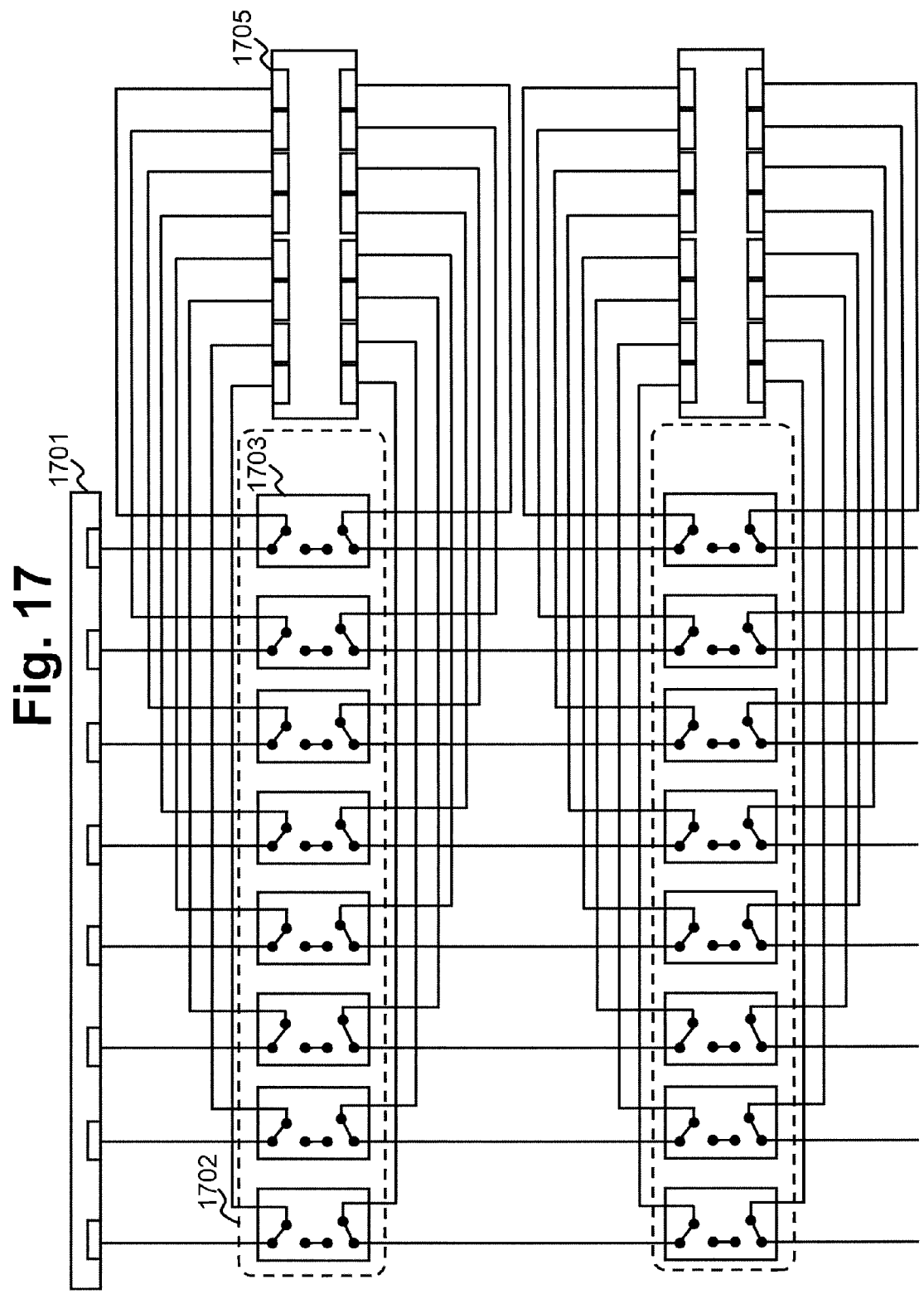
FIG. 17 shows an SAS controller, expanders, and MUXs according to Embodiment 2 of the present invention.

FIG. 17 shows an SAS controller, expanders, and MUXs according to Embodiment 2 of the present invention.

A SAS controller 1701 has eight phys 1711. Therefore, eight SAS links are coupled to the SAS controller 1701. In other words, each of the first and second communication paths has the eight SAS links (in Embodiment 1, each of the first and second communication paths has four SAS links). Specifically, one SAS link is coupled to one of the phys of the SAS controller 1701. Note that each SAS link is a collection of two or more serially coupled links, each of which is, for example, a line connecting a phy of the SAS controller and a upper-level phy of the expander, or a line connecting a lower-level link of the expander and a upper-level phy of the expander.

Because there are eight SAS links, an expander 1705 has eight upper-level phys and eight lower-level phys. The eight upper-level phys and the eight lower-level phys are coupled to the eight phys of the SAS controller, the eight upper-level phys or the eight lower-level phys of another expander, through a MUX 1702.

The MUX 1702 has eight switch modules 1703. In units of switch modules 1703, the upper-level and lower-level actual connections of the switch modules 1703 are switched between the expander 1705 or the MUX 1702 (in Embodiment 1 as well, the switch modules 1703 may be adopted in place of the switch modules 401). Accordingly, whether to bypass the expander can be switched in units of SAS links.

According to Embodiment 2, load can be dispersed by controlling the configuration of each SAS link. Dispersion of load is described hereinafter in detail.

Figure 18:
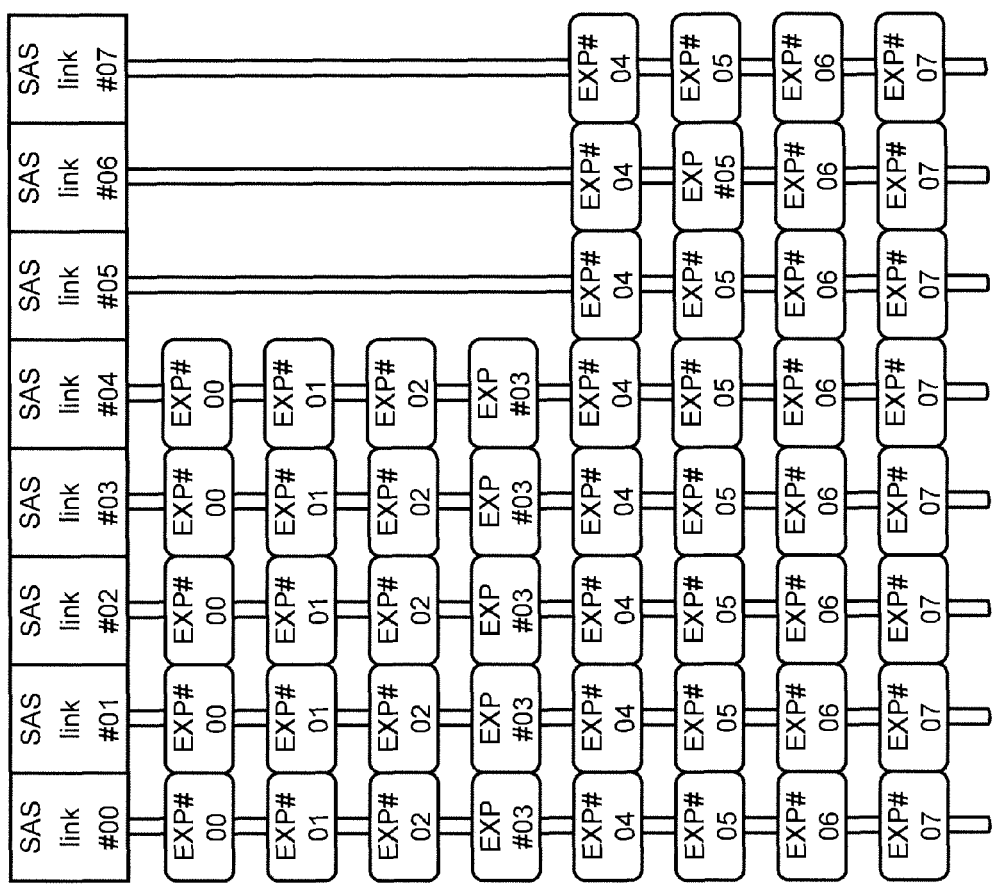
FIG. 18 shows an example of the configuration of eight SAS links according to Embodiment 2.

FIG. 18 shows an example of the configuration of the eight SAS links according to Embodiment 2. FIG. 19 shows a table that illustrates an example of the configuration of the eight SAS links shown in FIG. 18.

According to Embodiment 2, whether to bypass a certain expander can be switched in units of SAS links (in units of switch modules 1703).

In Embodiment 2, the configuration of each SAS (whether to bypass a certain expander for each SAS link) is controlled such that a prediction time period during which processing all of incomplete commands is completed becomes the minimum. The MPU #0 (#1) predicts a time that is required for completing processing all of the incomplete commands of the SAS controller #0 (#1), and determines a connection pattern (configuration of the eight SAS links) in which the prediction time period (process completion prediction time period) is minimum. The MPU #0 (#1) stores a table illustrating the connection pattern (the table shown in FIG. 19), into a storage resource (CM, for example) within the CTL #0 (#1), and realizes the connection pattern illustrated by the table (the configuration illustrated in FIG. 18). More specifically, for example, the expanders #00 to #07 are coupled to the eight SAS links #00 to #07 and, in the determined connection pattern, the SAS links #0 to #4 includes the expanders #00 to #07 but the SAS links #05 to #07 do not include the expanders #00 to #03 of the expanders #00 to #07. In this case, the MPU #0 specifies a plurality of phys coupled to the SAS links #05 to #07 out of the plurality of phys possessed by the expanders #00 to #03, and switches the actual connection destination of each of the switch modules 1703 coupled to each of the specified phys, from the expander (#00 to #03) to the MUX. Accordingly, only for the SAS links #05 to #07 of the SAS links #00 to #07, the expanders #00 to #03 are bypassed and the configuration illustrated in FIG. 18 is realized.

Note in the present embodiment that the term "incomplete command(s)" may indicate only the commands that are not yet issued from the SAS controller, or indicate not only the unissued commands but also the commands that are already issued from the SAS controller but not completed.

Hereinafter, a flow of connection pattern control processing (load dispersion processing) performed in Embodiment 2 is described. This processing is carried out in either one of the first and second communication paths, but examples with the first communication path are described below.

FIG. 20 shows a flow of the connection pattern control processing. This connection pattern control processing is started at time points accord to a predetermined rule. Examples of the time points according to the predetermined rule include a time point after the elapse of a certain period of time from the start of the previous connection pattern control processing to the completion thereof, a randomly determined time point, and a time point designated by the user.

In S2001, the MPU #0 specifies one or more incomplete commands from a plurality of commands issued to the SAS controller #0.

In S2002, the MPU #0 predicts the time required for all of the incomplete commands to each media drive to be completed for each media drive, based on the following information (a) to (c):
(a) Information on one or more specified incomplete commands;

(b) Information indicating the determined connection pattern (the configuration of the plurality of SAS links (#00 to #07)); and
(c) Information indicating which media drive is coupled to a certain expander #0q.

The time predicted for each media drive is referred to as "drive prediction time period." Note that the term "determined connection pattern" used in S2002 means not the actual connection pattern but the connection pattern that is determined in S2008 in the previous connection pattern control processing, which is a virtual connection pattern.

In S2003, the MPU #0 predicts the time required for completing processing all of the incomplete commands, based on the plurality of drive prediction time periods. The prediction time periods that are calculated here are the "processing completion prediction time periods" mentioned above.

In S2004, the MPU #0 determines whether the processing completion prediction time period that is calculated in the last S2003 is the shortest time period among the processing completion prediction time periods that are calculated up to now. When the result of the determination is positive (S2004: Yes), steps S2005 and S2006 are carried out. When the result of the determination is negative (S2004: No), the steps S2005 and S2006 are skipped.

In S2005, the MPU #0 stores, in the storage resource (CM, for example) within the CTL #0 (#1), a value representing the processing completion prediction time period calculated in the current step S2003, as a minimum value.

In S2006, the MPU #0 stores, in the storage resource (CM, for example) with the CTL #0 (#1), information indicating that the current connection pattern is the connection pattern having the shortest processing completion prediction time period.

In S2007, the MPU #0 determines whether the processing completion prediction time periods for all possible connection patterns are calculated or not. When the result of this determination is negative (S2007: No), a step S2008 is carried out. When the result of this determination is positive (S2007: Yes), a step S2009 is carried out.

In S2008, the MPU #0 determines, from all possible connection patterns, one connection pattern in which the processing completion prediction time period is not yet calculated. Whether the actual connection pattern (the configuration of the first communication path) follows the connection pattern determined in S2008 or not is based on the result of the determination made in S2009.

In S2009, the MPU #0 predicts the time period required for the current connection pattern (the actual connection pattern) to be changed to the connection pattern in which the processing completion prediction time period becomes the minimum value ("connection pattern changing time period" hereinafter), and then obtains the sum of the predicted connection pattern changing time period and the minimum value of the processing completion prediction time period. The MPU #0 then determines whether this sum is smaller than the processing completion prediction time period according to the current connection pattern (the actual connection pattern) or not. When the result of this determination is negative (S2009: No), a step S2010 is not carried out. When the result of this determination is positive (S2009: Yes), the step S2010 is performed. This is because reducing the entire time period required for processing all of the incomplete commands can be expected by changing the connection pattern.

In S2010, the MPU #0 changes the current connection pattern (the actual connection pattern) to the connection pattern in which the processing completion prediction time period becomes the minimum value. More specifically, the MPU #0 causes the MUX control expander, by means of the SAS controller #0, to change the actual connection destination of the MUXs (switch modules) that is associated with the difference between the current connection pattern (the actual connection pattern) and the connection pattern in which the processing completion prediction time period becomes the minimum value.

A flow of calculating the processing completion prediction time periods is described hereinafter in detail with reference to FIG. 21 and subsequent diagrams.

FIG. 21 shows the explanation of the symbols described in the following description and/or the diagrams.

FIG. 22A shows the explanation of reference numerals added to the symbols described in the following description and/or the diagrams.

FIG. 22B shows an incomplete command management table according to Embodiment 2.

This table 2210 is created as the results of S2001 shown in FIG. 20, and stored in the storage resource (CM, for example) within the CTL #0 (#1). This table 2210 has the following information for each incomplete command:

EXP No. {j} 2221, which is the number of an expander coupled to a media drive to which an incomplete command is transmitted;

Drive No. {k} 2222, which is the number of the media drive to which the incomplete command is transmitted;

A command 2223 representing the type of the incomplete command;

RDC 2224, which is graph showing whether the incomplete command is a read command or not; and A transfer length 2225 representing the length of transfer of data according to the incomplete command.

FIG. 23 shows the explanation of symbols described in the following description.

The MPU #0 performs the calculation in the following procedure.

(S1) The MPU #0 calculates an average data transfer speed ($ATR_{jk}$) of a media drive (k) on the basis of a transfer speed for each command type (and for each media drive type) and the type and transfer length of an incomplete command, for each media drive. More specifically, the following steps, for example, are carried out:

(1a) A table 2401 (see FIG. 24A) showing the transfer speed of each command type is stored in the storage resource within the CTL #0, for example. The table 2401 may exist for each media drive type;

(1b) The MPU #0 calculates, for each command, RDC×LNG/RTR and (1−RDC)×LNG/WTR, based on the table 2210 (see FIG. 22B) and the table 2401 (for example, the table 2401 corresponding to each type of the media drive) (see FIG. 24B); and (1c) The MPU #0 calculates an average data transfer speed for each media drive in accordance with the following Math. 1, based on the table 2210 (see FIG. 22B) and the result of the calculation performed in (1b) above.

FIG. 24C shows the average data transfer speed calculated for a single media drive.

(S2) The MPU #0 calculates, for each SAS link, the number of media drives ($NDL_i$) coupled to the SAS links in accordance with Math. 2, on the basis of the determined connection pattern (the virtual connection pattern (see FIG. 25A, for example) of the present time (time point S2)) and the information indicating how many media drives are coupled to a certain expander. Note in this calculation step that the CNCT is as illustrated in FIG. 25A, and the information indicating how many media drives are coupled to a certain expander is as shown in FIG. 25B. Therefore, in this calculation step, CNCT×ND is as shown in FIG. 26A, and thus the number of media drives coupled to a certain SAS link (i) is as shown in FIG. 26B.

$$NDL_i = \sum_{j=1}^{NE} CNCT_{ij} \times ND_j \qquad \text{[Math. 2]}$$

(S3) The MPU #0 calculates, for each expander (j), the probability ($PEGL_{ij}$) with which this expander can use each SAS link (i), in accordance with Math. 3. An example of a result of the calculation is shown in FIG. 27.

$$PEGL_{ij} = \frac{CNCT_{ij} \times ND_j}{NDL_i} \qquad \text{[Math. 3]}$$

(S4) The MPU #0 calculates, for each expander (j), the sum of probabilities ($SPEGL_{ij}$) with which this expander (j) can use the SAS link (i), in accordance with Math. 4. An example of a result of the calculation is shown in FIG. 28.

$$SPEGL_j = \sum_{i=1}^{NP} PEGL_{ij} \qquad \text{[Math. 4]}$$

(S5) The MPU #0 calculates, for each expander (j), the rate ($PEUL_{ij}$) at which the expander (j) uses the SAS link (i), in accordance with Math. 5. An example of a result of the calculation is shown in FIG. 29A.

$$PEUL_{ij} = \frac{PEGL_{ij}}{SPEGL_j} \qquad \text{[Math. 5]}$$

(S6) The MPU #0 calculates, for each expander (j), the maximum bandwidth (the bandwidth restricted to the drive transfer speed) ($MBD_{ij}$) that can be used when the expander (j) uses the SAS link (i), in accordance with Math. 6. An example of a result of the calculation is shown in FIG. 29B.

[Math. 1]

$$ATR_{jk} = \frac{\sum_{h=1}^{NC_{jk}} LNG_{jkh}}{\left(\sum_{h=1}^{NC_{jk}} \frac{RDC_{jkh} \times LNG_{jkh}}{RTR_{jk}}\right) + \left(\sum_{h=1}^{NC_{jk}} \frac{(1-RDC_{jkh}) \times LNG_{jkh}}{WTR_{jk}}\right)}$$

$$MBD_{ij} = \left(\sum_{k=1}^{ND_j} ATR_{ijk}\right) \times PEUL_{ij} \quad \text{[Math. 6]}$$

(S7) The MPU #0 calculates, for each expander (j), the maximum bandwidth (the bandwidth restricted to the bandwidth of the SAS link) ($MBL_{ij}$) that can be used when the expander (j) uses the SAS link (i), in accordance with Math. 7. An example of BW obtained in the calculation step is shown in FIG. 30A, and an example of a result of the calculation is shown in FIG. 30B.

$$MBL_{ij} = BW_i \times PEGL_{ij} \quad \text{[Math. 7]}$$

(S8) The MPU #0 takes the smaller one of $MBD_{ij}$ and $MBL_{ij}$ as a bandwidth ($OBW_{ij}$) that is used when the expander (j) uses the SAS link (i), for each expander (j). More specifically when $MBD_{ij} < MBL_{ij}$, $OBW_{ij} = MBD_{ij}$. When $MBD_{ij} > MBL_{ij}$, $OBW_{ij} = MBL_{ij}$. An example of $OBW_{ij}$ is shown in FIG. 31A.

(S9) The MPU #0 calculates, for each expander (j), the sum of the bandwidths ($SOBW_j$) of all of the SAS links coupled to the expanders (j), in accordance with Math. 8. An example of a result of the calculation is shown in FIG. 31B.

$$SOBW_j = \sum_{i=1}^{NL} OBW_{ij} \quad \text{[Math. 8]}$$

(S10) The MPU #0 calculates, for each expander (j), a bandwidth ($OBWD_j$) of each one of the media drives coupled to the expanders (j), in accordance with Math. 9. An example of a result of the calculation is shown in FIG. 32.

$$OBWD_j = \frac{SOBW_j}{ND_j} \quad \text{[Math. 9]}$$

(S11) The MPU #0 calculates, for each media drive (k), the sum of transfer lengths ($SLNG_{jk}$) of the incomplete commands on the basis of the incomplete command management table 2210 (see FIG. 22B), in accordance with Math. 10. An example of a result of the calculation is shown in FIG. 33.

$$SLNG_{jk} = \sum_{k=1}^{NC_{jk}} LNG_{jk} \quad \text{[Math. 10]}$$

(S12) The MPU #0 calculates, for each media drive (k), a prediction time period (drive completion time period) ($PTP_{jk}$) required for processing all of the commands transmitted to the drives, in accordance with Math. 11. An example of $DLY_{jk}$ obtained in this calculation step is shown in FIG. 34, and an example of the calculation result ($PTP_{jk}$) is shown in FIG. 35.

$$PTP_{jk} = \frac{SLNG_{jk}}{OBWD_j} + DLY_{jk} \quad \text{[Math. 11]}$$

(S13) The MPU #0 obtains the minimum value (MPTP) out of the plurality of drive completion time periods, in accordance with Math. 12. As shown in FIG. 35, the MPTP is 36.6473684.

$$MPTP = \text{Min}(PTP_{jk}) \quad \text{[Math. 12]}$$

(S14) The MPU #0 calculates, for each media drive, the data transfer length of each drive ($SLNG_{jk}$), based on the elapse of a time period corresponding to the minimum value (MPTP), in accordance with Math. 13. An example of a result of the calculation is shown in FIG. 36.

$$SLNG_{jk} = SLNG_{jk} - OBWD_j \times MPTP \quad \text{[Math. 13]}$$

(S15) The MPU #0 calculates, for each media drive, a remaining time period ($PTP_{jk}$) before the drive completion time period, in accordance with Math. 14. An example of a result of the calculation is shown in FIG. 37.

$$PTP_{jk} = \frac{SLNG_{jk}}{OBWD_j} + DLY_{jk} \quad \text{[Math. 14]}$$

(S16) The abovementioned steps (S2) to (S14) are repeated until the drive completion time periods of all media drives become 0.

(S17) The MPU #0 obtains the sum of the minimum values of the drive completion time periods of the drives that are obtained in the steps, as the processing completion prediction time period, as shown in Math. 15.

$$PTTP = \Sigma MPTP \quad \text{[Math. 15]}$$

Figure 38:
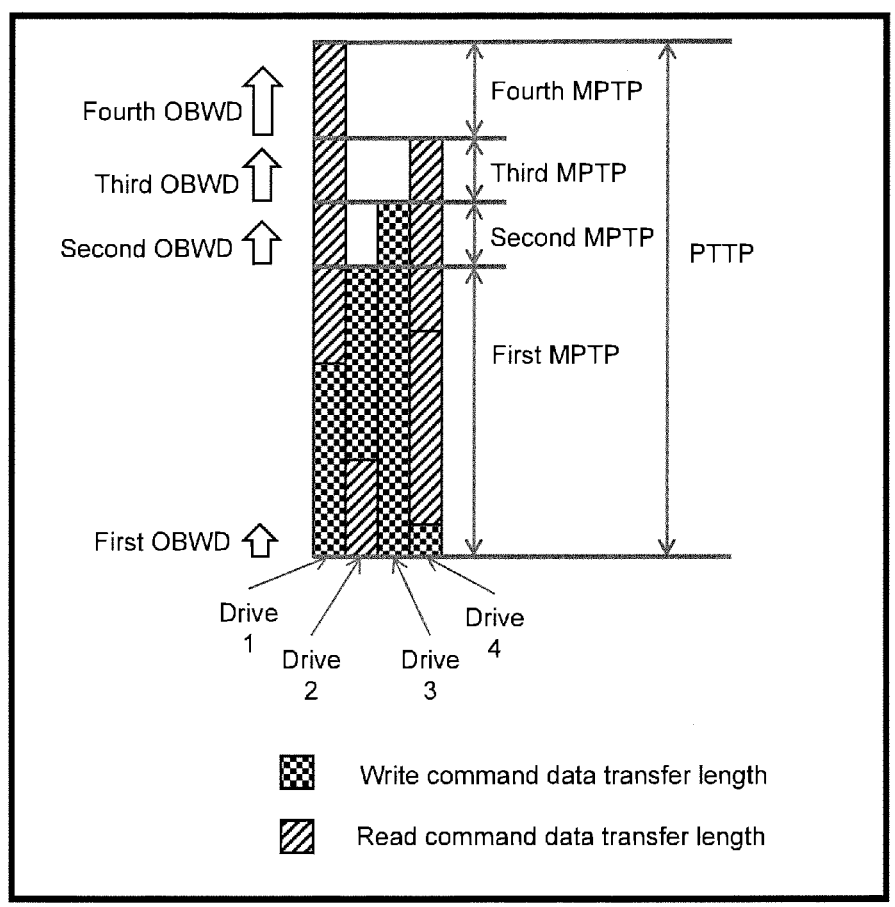
FIG. 38 shows an example of how MPTP is repeatedly obtained.

The processing completion prediction time periods are calculated in the flow described above. Note that an example of an image of repeatedly obtaining the MPTP is shown in FIG. 38 (this is a diagram assuming a case in which only four of the media drives transfer the data for a single expander).

Embodiment 2 described above can determine the bypass target expander for each SAS link and calculate the connection pattern with which a completion of processing the plurality of incomplete commands at the shortest period of time in the SAS controller can be expected (which one of the expanders is bypassed in a certain SAS link out of the plurality of SAS links). When the sum of the processing completion prediction time period expecting the calculated connection pattern and the prediction time period required for changing the connection pattern is smaller than the processing completion prediction time period expected for the current actual connection pattern, the current actual connection pattern is changed to the calculated connection pattern. As a result, reduction in throughput of the back-end of the SAS storage system can be suppressed. Note that the "incomplete commands" are the commands transmitted to the media drives and may not be commands transmitted to the expanders.

Although several embodiments of the present invention are described above, these are merely illustrative examples of the present invention, and the scope of the present invention is not limited to these embodiments. The present invention can be implemented in various other embodiments.

REFERENCE SIGNS LIST

300 Storage system

The invention claimed is:

1. A storage system, comprising:
a plurality of storage devices;
first and second controllers coupled to a host and to each other;
a first communication path, which is a path for communication according to a SAS, and which is coupled to the first controller and to the plurality of storage devices; and a second communication path, which is a path for communication according to the SAS, and which is coupled to the second controller and to the plurality of storage devices, wherein each of the communication paths has a plurality of expanders coupled serially, a highest-order expander of the plurality of expanders is coupled to the controllers, and the plurality of storage devices are coupled to one or more of the plurality of expanders, each expander is coupled to a switch device for switching whether to bypass the expander or not with regard to each of the communication paths, an actual connection destination of any of the plurality of switch devices that bypasses an expander is a switch device in an upper-level and/or a lower-level, and wherein an actual connection destination of any of the plurality of switch devices that does not bypass an expander is the expander, wherein both the first and second communication paths have two or more expander connectors to which the plurality of expanders are coupled, each of the controllers includes a SAS controller that issues a command according to the SAS and is coupled to a highest-order switch device, and wherein when a new expander is coupled to a free expander connector out of the two or more expander connectors in both the first and second communication paths, each of the controllers is configured to carry out following processing with respect to the communication path coupled to the controller;

(a) of the plurality of switch devices through which the corresponding communication path passes, an actual connection destination of a switch device corresponding to an expanded expander, which is a newly coupled expander, is changed to the expanded expander, whereby the corresponding communication path passes through the expanded expander;

(b) information on the expanded expander is registered into the SAS controller;

(c) information on all of the storage devices coupled to the expanded expander is registered into all of the expanders in a upper-level than the expanded expander; and (d) information on all of the storage devices coupled to all of the expanders in a lower-level than the expanded expander is registered into the expanded expander, wherein the first controller is configured to perform the processing (a) to (d), and thereafter the second controller is configured to perform the processing (a) to (d), and wherein prior to the processing (a), each of the controllers is configured to perform following processing:

(f) when an I/O command is received from the host, a mode is transformed into a mode in which the I/O command is transferred to another controller; and (g) completion of execution of all commands that are already issued from the controller are waited for, wherein any one of the plurality of expanders in the first and second communication paths is a switch control expander that is coupled to the plurality of switch devices and changes an actual connection destination of each of the switch devices, and wherein each of the controllers, in the processing (a), is configured to transmit a command for changing an actual connection destination of a switch device corresponding to the expanded expander, to the switch control expander in the communication path corresponding to the controller, and, accordingly, the switch control expander that receives the command is configured to change the actual connection destination of the switch device corresponding to the expanded expander, to the expanded expander.

2. The storage system according to claim 1, further comprising an expander detection device that is coupled to two or more expanders in both the first and second communication paths, wherein the expander detection device is configured to store expander position management information indicating to which expander connector the expanders are coupled, and wherein the first or second controller is configured to receive the expander position management information from the expander detection device, and specifies which one of the expanders is the expanded expander on the basis of the expander position management information, and thereafter each of the controllers carries out the processing (a) to (d).

3. A storage system, comprising:

a plurality of storage devices;

first and second controllers coupled to a host and to each other;

a first communication path, which is a path for communication according to a SAS, and which is coupled to the first controller and to the plurality of storage devices; and a second communication path, which is a path for communication according to the SAS, and which is coupled to the second controller and to the plurality of storage devices, wherein each of the communication paths has a plurality of expanders coupled serially, a highest-order expander of the plurality of expanders is coupled to the controllers, and the plurality of storage devices are coupled to one or more of the plurality of expanders, each expander is coupled to a switch device for switching whether to bypass the expander or not with regard to each of the communication paths, an actual connection destination of any of the plurality of switch devices that bypasses an expander is a switch device in an upper-level and/or a lower-level, and wherein an actual connection destination of any of the plurality of switch devices that does not bypass an expander is the expander, wherein each of the expanders has a plurality of phys and, for each phy, manages a number of status changes, which is the number of times the phy status is changed, a failure is detected when broadcasted failure occurrence information is received, through the communication path associated with the failure, by the controller that is coupled to this communication path, and wherein the controller that has detected the failure is configured to carry out following processing:

(A) the number of status changes is received for each phy from all of the expanders in the communication path to which the controller is coupled;

(B) the number of status changes, obtained in the processing (A), for each phy of all of the expanders in the communication path is compared with the number of status changes, obtained in a previous processing (A), for each phy of all of the expanders in the communication path, whereby specifying a first expander, which is an expander having a phy with an increased number of status changes is specified; and (C) the first expander or a second expander immediately at lower-level of the first expander is bypassed.

4. The storage system according to claim 3, wherein the controller that detects the failure is configured to performs following processing in the processing (C):

(c1) determination is made as to whether the number of status changes of all of the phys coupled to the second expander at lower-level of the first expander, from among the plurality of the phys of the first expander, is increased or not;

(c2) when a result of the determination made in the processing (c1) is affirmative, an actual connection destination of a switch device corresponding to the second expander is changed so as to bypass the second expander;

(c3) a third expander, which is a new expander at lower-level of the first expander, is checked based on the fact that the second expander is bypassed; and (c4) when the checking in the processing (c3) is completed normally, determination is made to transmit a command addressed to the storage devices coupled to the bypassed second expander, through the other communication path.

5. The storage system according to claim 4, wherein the controller that has detected the failure is configured to carry out following processing when the checking in the processing (c3) is not completed normally:

(c5) the actual connection destination of the switch device corresponding to the second expander is changed so as to cancel the bypass of the second expander;

(c6) an actual connection destination of a switch device corresponding to the first expander is changed so as to bypass the first expander;

(c7) the second expander is checked; and (c8) when the checking in the processing (c7) is completed normally, determination is made to transmit a command addressed to the storage devices coupled to the bypassed first expander, through the other communication path.

6. A storage system, comprising:
a plurality of storage devices;
first and second controllers coupled to a host and to each other;
a first communication path, which is a path for communication according to a SAS, and which is coupled to the first controller and to the plurality of storage devices; and
a second communication path, which is a path for communication according to the SAS, and which is coupled to the second controller and to the plurality of storage devices, wherein
each of the communication paths has a plurality of expanders coupled serially, a highest-order expander of the plurality of expanders is coupled to the controllers, and the plurality of storage devices are coupled to one or more of the plurality of expanders,
each expander is coupled to a switch device for switching whether to bypass the expander or not with regard to each of the communication paths,
an actual connection destination of any of the plurality of switch devices that bypasses an expander is a switch device in an upper-level and/or a lower-level, and wherein
an actual connection destination of any of the plurality of switch devices that does not bypass an expander is the expander,
wherein
each of the communication paths includes a plurality of SAS links,
each of the SAS links includes a plurality of serial links, each of which is a line connecting phys of the expanders to each other, or a line connecting each controller to a phy of the highest-order expander,
each of the switch devices has a configuration that performs switching between whether the actual connection destination is to be the expanders or not, for each of the phys of the expanders, and wherein
each of the controllers is configured to carry out following processing for the communication paths coupled to the controllers:

(P) a connection pattern, which is a communication path configuration indicating a certain expander to be bypassed in a certain SAS link of the plurality of SAS links, and which has the shortest processing completion prediction time period that is required for completing processing all incomplete commands in the relevant communication path, is calculated;

(Q) the processing completion prediction time period that is expected for a current actual connection pattern is calculated;

(R) determination is made as to whether a sum of the processing completion prediction time period expected for the connection pattern, which is calculated in the processing (P), and a time period predicted to be required for changing the connection pattern, is shorter than the processing completion prediction time period calculated in the processing (Q); and (S) when a result of the determination made in the processing (R) is affirmative, an actual connection destination of one or more of the switch devices is changed in units of phys of the expanders, so as to change the current actual connection pattern to the connection pattern calculated in the processing (P).

7. The storage system according to claim 6, wherein in the processing (P), for each storage device, a sub-processing completion prediction time period, which is a prediction value of a time period required for processing one or more incomplete commands addressed to the storage device, is calculated,
the processing completion prediction time period is calculated based on the plurality of calculated sub-processing completion prediction time periods, and wherein
the sub-processing completion prediction time periods are calculated based on types of the storage devices, types of the commands transmitted to the storage devices, and transfer speed corresponding to the type of each command.

8. A storage system, comprising:
a plurality of storage devices;
first and second controllers coupled to a host and to each other;
a first communication path, which is a path for communication according to a SAS, and which is coupled to the first controller and to the plurality of storage devices; and a second communication path, which is a path for communication according to the SAS, and which is coupled to the second controller and to the plurality of storage devices, wherein each of the communication paths has a plurality of expanders coupled serially, a highest-order expander of the plurality of expanders is coupled to the controllers, and the plurality of storage devices are coupled to one or more of the plurality of expanders, each expander is coupled to a switch device for switching whether to bypass the expander or not with regard to each of the communication paths, an actual connection destination of any of the plurality of switch devices that bypasses an expander is a switch device in an upper-level and/or a lower-level, and wherein an actual connection destination of any of the plurality of switch devices that does not bypass an expander is the expander, wherein in the first and second communication paths, any of the plurality of expanders is a switch control expander that is coupled to the plurality of switch devices and changes an actual connection destination of each of the switch devices, and wherein each of the controllers is configured to transmit a command for changing the actual connection destination of each switch device, to the switch control expander via the communication path corresponding to each of the controller, whereby the switch control expander that receives the command is configured to change the actual connection destination of a specific switch device in response to the command.

9. The storage system according to claim 8, wherein the switch control expander is a highest-order expander.

* * * * *